United States Patent
Oniki

(10) Patent No.: US 10,949,955 B2
(45) Date of Patent: Mar. 16, 2021

(54) IMAGE PROCESSING METHOD, IMAGING APPARATUS USING THE SAME, IMAGE PROCESSING APPARATUS, STORAGE MEDIUM, AND LENS APPARATUS

(71) Applicant: CANON KABUSHIKI KAISHA, Tokyo (JP)

(72) Inventor: Takashi Oniki, Utsunomiya (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 131 days.

(21) Appl. No.: 16/238,717

(22) Filed: Jan. 3, 2019

(65) Prior Publication Data
US 2019/0213717 A1    Jul. 11, 2019

(30) Foreign Application Priority Data
Jan. 5, 2018  (JP) .............................. JP2018-000788

(51) Int. Cl.
G06T 5/00 (2006.01)
G06T 5/20 (2006.01)

(52) U.S. Cl.
CPC ................ G06T 5/004 (2013.01); G06T 5/20 (2013.01)

(58) Field of Classification Search
CPC .................................. G06T 5/004; G06T 5/20
See application file for complete search history.

(56) References Cited

U.S. PATENT DOCUMENTS

| | | | |
|---|---|---|---|
| 8,391,637 B2 * | 3/2013 | Kinoshita | G06T 5/20 382/167 |
| 8,416,335 B2 | 4/2013 | Watanabe | |
| 8,749,692 B2 * | 6/2014 | Watanabe | H04N 5/772 348/222.1 |
| 9,563,941 B2 * | 2/2017 | Oniki | G06T 5/004 |
| 2015/0097993 A1 | 4/2015 | Oniki | |
| 2016/0048952 A1 * | 2/2016 | Tezaur | G06T 5/004 382/255 |
| 2016/0110851 A1 * | 4/2016 | Oniki | G06T 5/003 348/241 |

(Continued)

FOREIGN PATENT DOCUMENTS

JP    2010081263 A    4/2010

OTHER PUBLICATIONS

Copending U.S. Appl. No. 16/238,652, filed Jan. 3, 2019 (a copy is not included because the cited application is not yet available to the public and the Examiner has ready access to the cited application).

(Continued)

*Primary Examiner* — Brenda C Bernardi
(74) *Attorney, Agent, or Firm* — Rossi, Kimms & McDowell LLP

(57) ABSTRACT

An image processing apparatus includes an acquirer configured to acquire a captured image generated through imaging by an optical system, a reconstruction processor configured to reconstruct a discretized point spread function of the optical system using coefficient data used to approximate the point spread function, and a sharpening processor configured to perform unsharp mask processing for the captured image based on information on the reconstructed point spread function. A discretization interval of the reconstructed point spread function is different according to an image height.

15 Claims, 12 Drawing Sheets

(56) References Cited

U.S. PATENT DOCUMENTS

| | | | |
|---|---|---|---|
| 2016/0150161 A1 | 5/2016 | Irie | |
| 2016/0371821 A1* | 12/2016 | Hayashi et al. | G06T 5/009 |
| 2017/0163885 A1* | 6/2017 | Oniki | H04N 5/23229 |
| 2018/0295260 A1* | 10/2018 | Oniki | G06T 1/20 |
| 2018/0309926 A1 | 10/2018 | Kishine | |
| 2019/0347773 A1 | 11/2019 | Naruse | |

OTHER PUBLICATIONS

Notice of Allowance issued in U.S. Appl. No. 16/238,652 dated Jun. 18, 2020.

\* cited by examiner

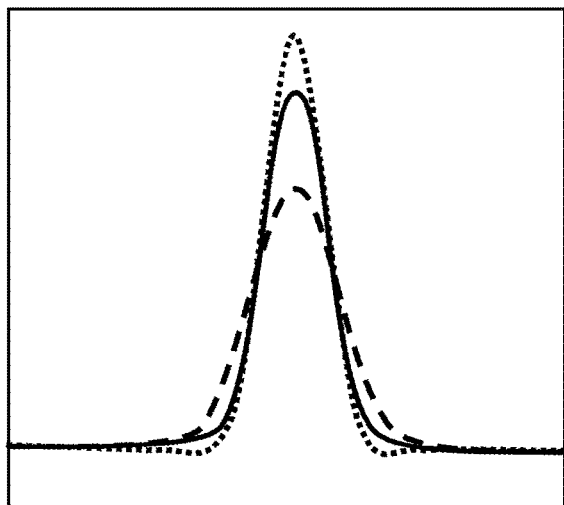
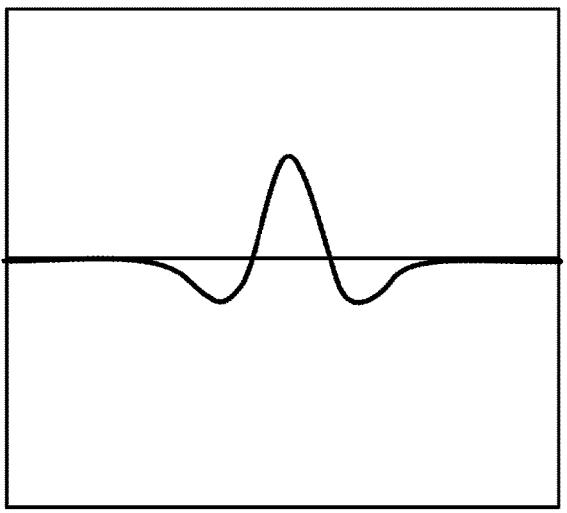
FIG. 3A
FIG. 3B
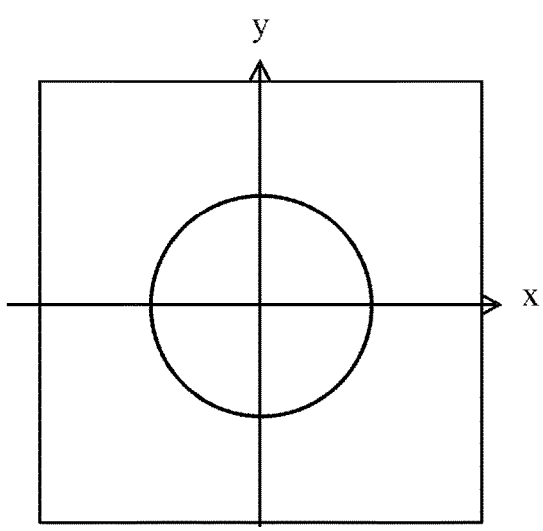
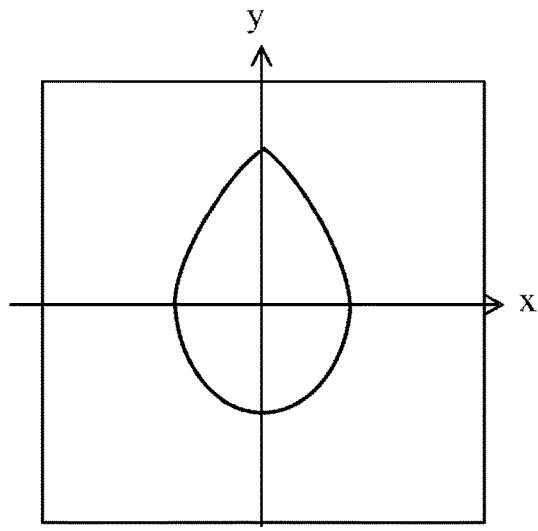
FIG. 4A
FIG. 4B

| G1 | B | G1 | B |
|----|---|----|---|
| R | G2 | R | G2 |
| G1 | B | G1 | B |
| R | G2 | R | G2 |

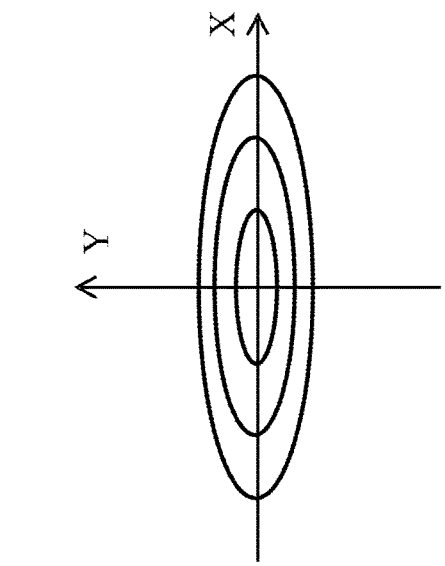
FIG. 10A
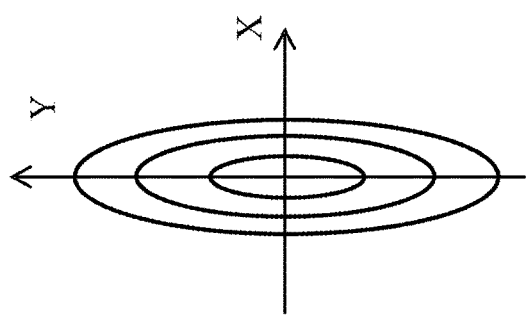
FIG. 10B
FIG. 10C
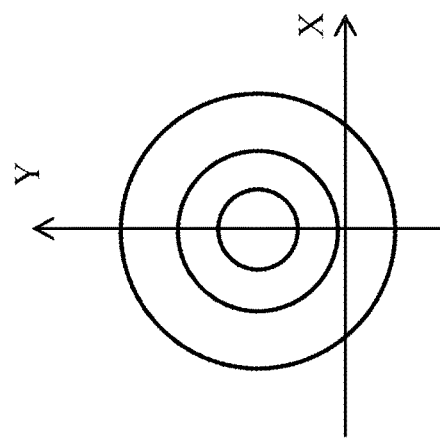
FIG. 10D
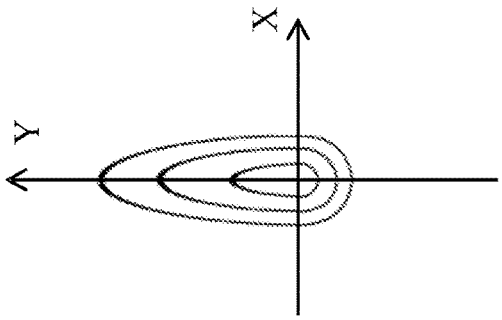
FIG. 10F
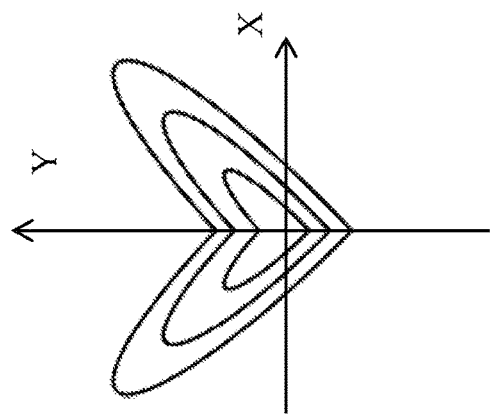
FIG. 10E
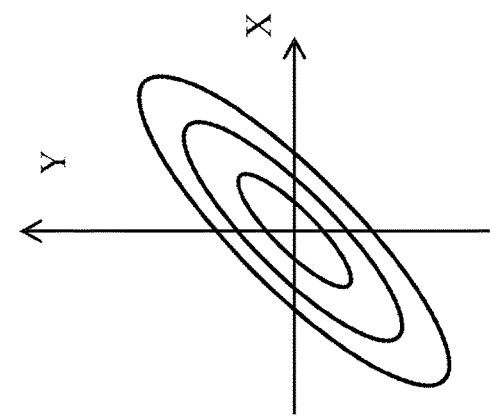

IMAGE PROCESSING METHOD, IMAGING APPARATUS USING THE SAME, IMAGE PROCESSING APPARATUS, STORAGE MEDIUM, AND LENS APPARATUS

BACKGROUND OF THE INVENTION

Field of the Invention

The present invention relates to an image processing apparatus configured to provide sharpening processing to an image.

Description of the Related Art

One conventionally known unsharp mask processing sharpens an image by adding to or subtracting from an original image a difference between the original image and a blurred image through an unsharp mask. The larger the difference between the blurred image and the input image is, the sharper the image becomes. Japanese Patent Laid-Open No. ("JP") 2010-81263 discloses a method for applying an asymmetric one-dimensional filter to a pixel signal sequence arranged in an image height direction, and for reducing the influence of the Point Spread Function ("PSF") of the optical system.

However, the conventional unsharp mask processing uses a rotationally symmetric filter for the unsharp mask, and has difficulties in sharpening an image deteriorated by the influence of the PSF having a complicated shape, such as an asymmetric aberration and a sagittal halo. An attempt to correct the aberration in the azimuth direction having a large aberration causes the undershoot in the azimuth direction having a small aberration. Conversely, an attempt to suppress the undershoot cannot fully correct the aberration.

The method in JP 2010-81263 considers only the asymmetry in the image height direction, uses a one-dimensional correction filter, and thus cannot improve the asymmetry in a non-image height direction. The image height direction is the meridional azimuth direction. In addition, this method adjusts the asymmetry of the filter by the number of minus tap coefficients for the filter, and the correction in the image height direction is different from the blurring state of the PSF of the optical system. Thus, the conventional method cannot provide sufficient sharpening.

SUMMARY OF THE INVENTION

The present invention provides an image processing method, an image processing apparatus, an imaging apparatus, a storage medium, and a lens apparatus, which can execute highly accurate sharpening processing.

An image processing apparatus according to one aspect of the present invention includes an acquirer configured to acquire a captured image generated through imaging by an optical system, a reconstruction processor configured to reconstruct a discretized point spread function of the optical system using coefficient data used to approximate the point spread function, and a sharpening processor configured to perform unsharp mask processing for the captured image based on information on the reconstructed point spread function. A discretization interval of the reconstructed point spread function is different according to an image height.

An image processing method according to another aspect of the present invention includes the steps of acquiring a captured image generated through imaging by an optical system, reconstructing a discretized point spread function of the optical system using coefficient data used to approximate the point spread function, and performing unsharp mask processing for the captured image based on information on the reconstructed point spread function. A discretization interval of the reconstructed point spread function is different according to an image height. A non-transitory computer readable storage medium for storing a computer program that enables a computer to execute the image processing method also constitutes another aspect of the present invention.

A lens apparatus according to another aspect of the present invention is attachable to an imaging apparatus having an image sensor and configured to communicate with the imaging apparatus. The lens apparatus includes an optical system, and a memory configured to store coefficient data used to approximate a point spread function of the optical system and a discretization coefficient used to adjust a discretization interval in reconstructing the point spread function so that the discretization interval is different according to an image height. The imaging apparatus reconstructs the discretized point spread function using the coefficient data and the discretization coefficient transmitted from the lens apparatus, and performs unsharp mask processing for a captured image generated through imaging by the optical system based on information on the reconstructed point spread function.

Further features of the present invention will become apparent from the following description of exemplary embodiments with reference to the attached drawings.

BRIEF DESCRIPTION OF THE DRAWINGS

FIGS. 3A and 3B schematically illustrate sharpening by unsharp mask processing according to each embodiment.

FIGS. 4A and 4B schematically illustrate a PSF of an imaging optical system on an xy plane according to each embodiment.

FIGS. 10A to 10F are contour maps of an approximated PSF.

DESCRIPTION OF THE EMBODIMENTS

Figure 1:
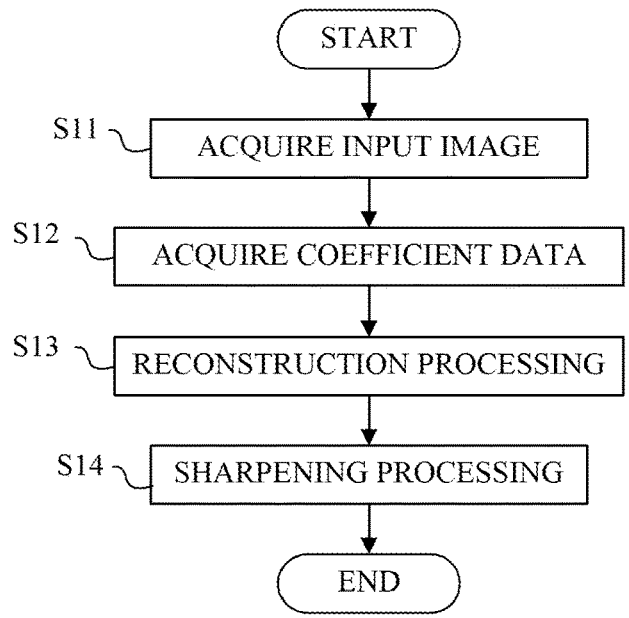
FIG. 1 is a flowchart illustrating an image processing method according to a first embodiment.

Referring now to the accompanying drawings, a description will be given of embodiments of the present invention.
Input Image An input image is a digital image (captured image) generated with an output from an image sensor that photoelectrically converts an object image (optical image) formed via an imaging optical system (optical system) in an imaging apparatus. The digital image is an image deteriorated by an optical transfer function (OTF: Optical Transfer Function) that contains the aberration of the optical system that includes optical elements, such as a lens and an optical filter. The image sensor includes a photoelectric conversion element, such as a CMOS sensor and a CCD sensor. The imaging optical system may include a mirror (reflective surface) having a curvature. The optical system may be attached to and detached from (or may be replaced from) the imaging apparatus. In the imaging apparatus, an imaging system includes the optical system, the image sensor, and an image processing circuit configured to generate a digital image (input image) using an output from the image sensor.

A color component of the input image contains information, for example, on RGB color components. The color component can be used by selecting a generally used color space, such as a brightness expressed by LCH, a hue, a chroma, a luminance expressed by YCbCr, and a color difference signal. Another color space may use, for example, XYZ, Lab, Yuv, and JCh, and the color temperature may also be used.

Information on an imaging condition (imaging condition information), such as a focal length, a F-number, an imaging distance, and an image height of the optical system in the imaging apparatus in generating (capturing) an input image, may be attached to an input image and an output image. Various correction information used to correct the input image may be attached to the input image and the output image. The imaging apparatus may output the input image to an image processing apparatus separately provided to the imaging apparatus, and the imaging condition information and the correction information may be attached to the input image for the image processing in the image processing apparatus. The imaging apparatus may directly or indirectly deliver the imaging condition information and the correction information to the image processing apparatus through communications.
Image Sharpening Processing FIGS. 3A and 3B are schematic diagrams of sharpening in the unsharp mask processing (image sharpening processing) according to this embodiment. In FIG. 3A, a solid line denotes an input image, a broken line denotes an image made by blurring the input image with an unsharp mask, and a dotted line denotes a sharpened image. A solid line in FIG. 3B is a correction component. In each of FIGS. 3A and 3B, an abscissa axis denotes a coordinate, and an ordinate axis denotes a pixel value or a luminance value. FIGS. 3A and 3B correspond to a section in a predetermined direction, such as an X direction, in FIGS. 4A and 4B.

Where f(x, y) is an original image and h(x, y) is a correction component, a sharpened image g(x, y) can be represented by Expression (1):

$$g(x,y)=f(x,y)+m \times h(x,y) \quad (1)$$

In Expression (1), m is an adjustment coefficient to change a correction intensity, and the adjustment coefficient m can be varied to adjust a correction amount. The adjustment coefficient m may be constant irrespective of a position in the input image or may be variable according to the position (image height) in the input image. Thereby, the correction amount can be adjusted according to the position in the input image. The adjustment coefficient m(x, y) may vary depending on the imaging condition such as a focal length, an aperture value (F-number), or an object distance in the optical system.

Where USM(x, y) is the unsharp mask, the correction component h(x, y) is expressed as follows:

$$h(x,y)=f(x,y)-f(x,y)*USM(x,y) \quad (2)$$

where USM(x, y) is, for example, a tap value at a coordinate (x, y).

The right side of Expression (2) is rewritten as below.

$$h(x,y)=f(x,y)*(\delta(x,y)-USM(x,y)) \quad (3)$$

In Expressions (2) and (3), * represents a convolution (convolution integral, product sum), and symbol δ represents a delta function (ideal point image). The "delta function" is data whose number of taps is equal to that of USM(x, y) and whose value is zero except for a central value of one. Expression (3) can be expressed by modifying Expression (2), and thus Expressions (2) and (3) are equivalent with each other. For this reason, Expression (2) is used below to describe generation of the correction component.

Expression (2) calculates a difference between the captured image f(x, y) and an image obtained by unsharpening the captured image f(x, y) with the unsharp mask, and the correction component h(x, y) is generated based on this difference information. The typical unsharp mask processing uses for the unsharp mask a smoothing filter such as a Gaussian filter, a median filter, and a moving average filter.

For example, when the Gaussian filter is applied as the unsharp mask to the captured image f(x, y) illustrated with the solid line in FIG. 3A, an image obtained by unsharpening the captured image f(x, y) is illustrated with the dashed line in FIG. 3A. The correction component h(x, y) is thus the difference between the captured image f(x, y) and the unsharpened image as in Expression (2). Thus, subtracting a dashed line in FIG. 3A from a solid line in FIG. 3A yields a solid line in FIG. 3B, which represents the correction component. The correction component thus calculated is used to calculate Expression (1) so as to sharpen the input image f(x, y) illustrated with the solid line in FIG. 3A and obtain the image illustrated with the short-dotted line in FIG. 3A.

Next follows a description of image sharpening through the unsharp mask processing on an image degraded through an imaging optical system configured to form an optical image of an object. Where I(x, y) is a pre-captured image (object image) and psf(x, y) is a point spread function PSF as a function representing a response of the optical system to a point light source, the captured image f(x, y) formed through the optical system can be expressed as follows:

$$f(x,y)=I(x,y)*psf(x,y) \quad (4)$$

If the imaging optical system is a rotationally symmetrical coaxial optical system, a PSF corresponding to the central part in the image is rotationally symmetric. This enables the sharpening processing to make closer the captured image f(x, y) to the original image I(x, y) by applying a rotationally symmetric USM to the central part in the image. Since the correction amount is a difference value between the captured image and an unsharpened image obtained through the unsharp mask, a more accurate correction requires the use of an unsharp mask that is shaped more similarly to psf(x, y), not a simple smoothing filter. For example, when a captured image is degraded due to the spherical aberration, which has rotationally symmetric influence, a smoothing filter such as the Gaussian filter has a different distribution shape from that of the PSF affected by the spherical aberration. Thus, the use of the PSF of the optical system improves the correction in reducing the rotationally symmetric unsharpening.

This embodiment uses the PSF as the unsharp mask USM(x, y). Although the captured image f(x, y) in FIG. 3A has a symmetrical shape for convenience, the shape of the input image may not be symmetric. Even when the original image I(x, y) has an asymmetric shape, as long as a degradation function of the original image I(x, y) corresponding to psf(x, y) is rotationally symmetric, the captured image can still be sharpened with a rotationally symmetric unsharp mask.

On the other hand, the PSF is usually asymmetric at positions in non-central part in the image, even when the optical system is a rotationally symmetric coaxial optical system. FIGS. 4A and 4B schematically illustrate the PSF of the optical system on the xy plane: FIG. 4A illustrates the on-axis PSF, and FIG. 4B illustrates the off-axis PSF.

For example, if the original image (object) is an ideal point image, Expression (4) shows that the captured image f(x, y) is the PSF of the optical system. Assume that the ideal point image exists in an angle of view corresponding to FIG. 4B and the original image (object) is degraded due to the PSF of the optical system. Then, an image obtained as the input image is a blurred image having the shape illustrated in FIG. 4B. Next follows a description of sharpening through the unsharp mask processing on the image thus asymmetrically blurred.

Figure 5A:
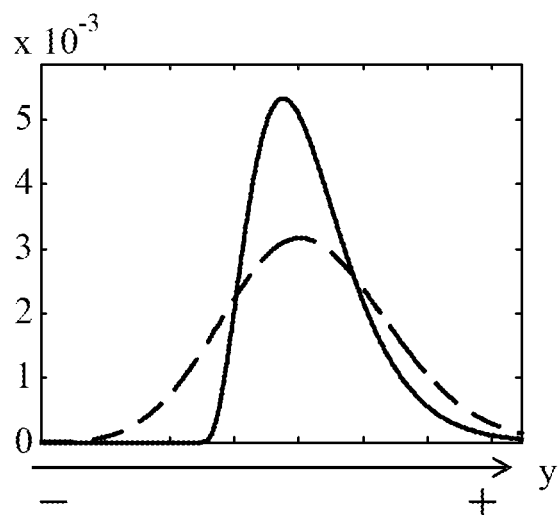
FIGS. 5A to 5C schematically illustrate sharpening processing with a rotationally symmetric unsharp mask according to each embodiment.
Figure 5B:
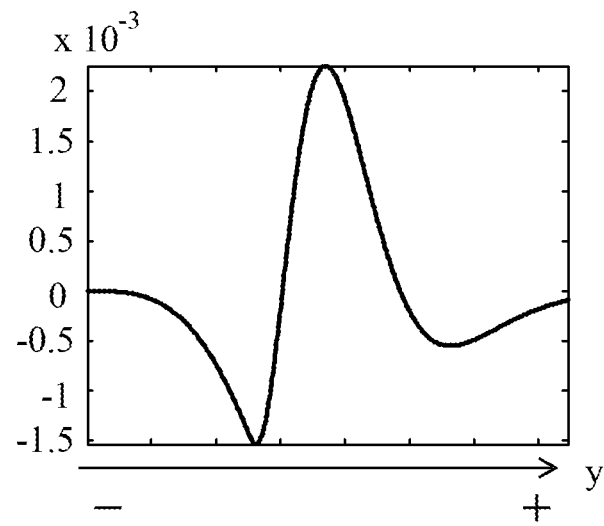
Figure 5C:
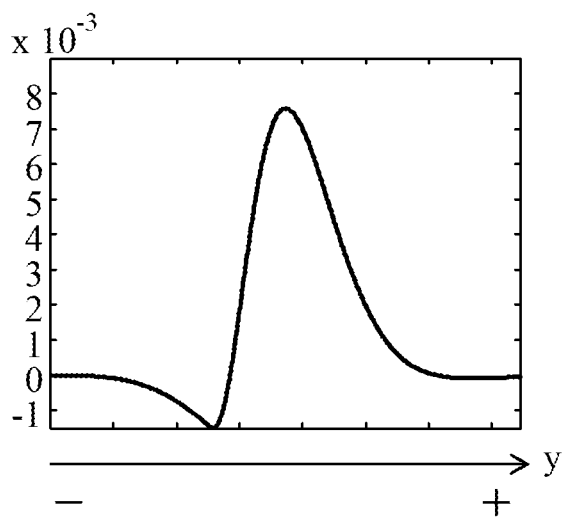
Figure 6A:
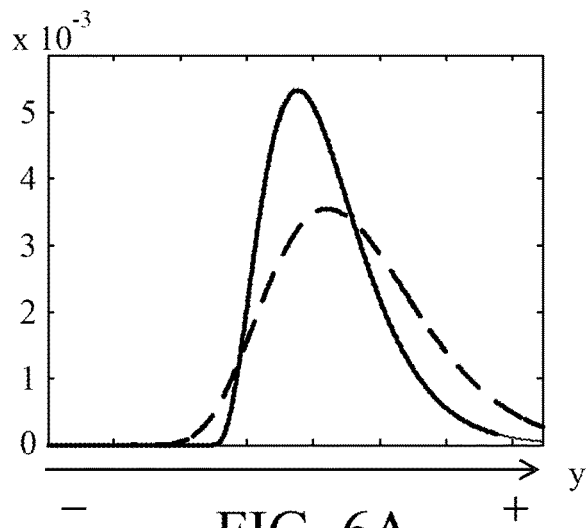
FIGS. 6A to 6C schematically illustrate the sharpening processing with a rotationally asymmetric unsharp mask according to each embodiment.
Figure 6B:
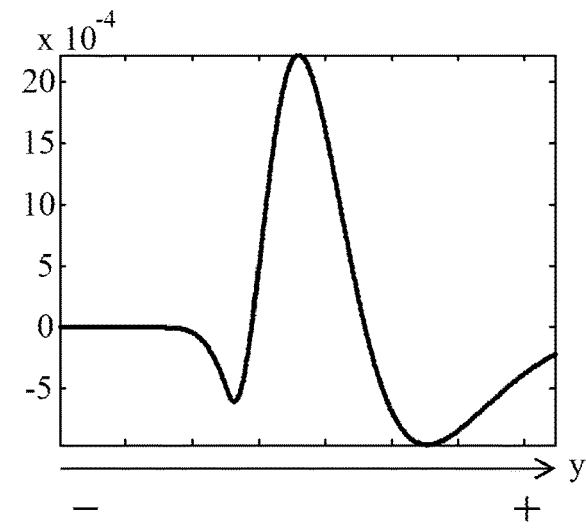
Figure 6C:
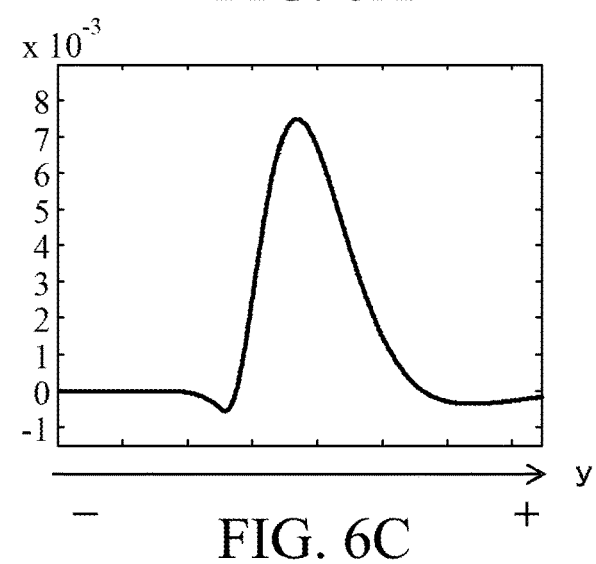

FIGS. 5A to 5C and FIGS. 6A to 6C schematically illustrate the unsharp processing to an asymmetrically degraded image. FIGS. 5A to 5C illustrate that the unsharp processing uses a rotationally symmetric unsharp mask. FIGS. 6A to 6C illustrate that the unsharp processing uses a rotationally asymmetric unsharp mask. The ordinate axis and the abscissa axis are the same as those in FIGS. 3A and 3B.

Solid lines in FIGS. 5A and 6A represent a section along the y direction in FIG. 4B, and dotted lines represent images obtained by blurring captured images with the respective unsharp masks. The rotationally symmetric unsharp mask in FIGS. 5A to 5C uses the Gaussian filter. The PSF of the imaging apparatus applies the rotationally asymmetric unsharp mask in FIGS. 6A to 6C.

FIGS. 5B and 6B respectively illustrate correction components as differences between the images obtained by blurring the input image with the respective unsharp masks and the original input image. For illustration convenience, in FIGS. 5A and 6A, an input image blurred by the PSF has an extended skirt on the plus side of the Y axis.

In FIG. 5A, the difference between the unsharpened image and the original input image is smaller on the plus side with respect to the peak position of the solid line and larger on the minus side. Therefore, the correction component illustrated in FIG. 5B has a higher extreme value on the right side (plus side) of the central peak position than that on the left side (minus side). It is understood from a comparison between curves in FIGS. 5A and 5B that the correction component has a correction amount smaller on the plus side in the captured image and a correction amount larger on the minus side on which the skirt does not extend. Thus, the sharpening with Expression (1) cannot correct an asymmetric blur.

FIG. 5C illustrates a sharpened result where m=. It is understood that sharpening is improved for the solid line in FIG. 5A but the minus side is significantly concave relative to the plus side and the asymmetrical blur is not successfully corrected. For example, assume that the correction amount is adjusted by changing the adjustment coefficient m in Expression (1) without changing the unsharp mask. When a large adjustment coefficient m is used to sufficiently correct the plus side of the input image, the minus side of the input image is overcorrected (undershot). In contrast, when the adjustment coefficient m is set such that the minus side of the input image is appropriately corrected, the plus side of the input image is not sufficiently corrected.

This unsharp mask processing with the rotationally symmetric unsharp mask to an asymmetrically blurred input image has difficulties in improving the asymmetry and sharpening the image. The same difficulties occur when rotationally symmetric filters other than the Gaussian filter are used as the rotationally symmetric unsharp mask.

On the other hand, the difference between the unsharpened image and the original input image is larger on the plus side with respect to the peak position illustrated by the solid line in FIG. 6A and is smaller on the minus side, and this tendency is opposite to the relationship in FIG. 5A. Therefore, the correction component illustrated in FIG. 6B has a higher extreme value on the left side (minus side) with respect to the central peak position than that on the right side (plus side). When this correction component is applied to the captured image illustrated by the solid line in FIG. 6A, a large correction amount on the plus side with respect to the peak position where a large blur exists and a small correction amount on the minus side where a small blur exists. The use of the asymmetric unsharp mask thus enables the blur of the input image and the correction amount of the correction component to have similar distributions, and reduces the excess-and-insufficient correction that occurs with the use of the rotationally symmetric unsharp mask. FIG. 6C illustrates a sharpened result where m=1. Sharpening is improved for the solid line in FIG. 6A, and a difference of a concave balance is improved between the minus side and the plus side that stand out in FIG. 5C. Moreover, this case is less likely to cause an overcorrection than the use of the rotationally symmetric unsharp mask, and thus a value of the adjustment coefficient m in Expression (1) can be set relatively large for more improved asymmetry and further sharpening. Since the correction amount of the correction component corresponds to the difference between the blurred image and the original image for more accurate corrections, a portion more blurred by the PSF of the optical system needs to be more blurred by the unsharp mask than other portions. Thus, it is ideal to use the PSF of the optical system as the unsharp mask for the more accurate corrections.

This embodiment illustrates an unsharp mask using the PSF as the image sharpening processing, but the PSF may be used for the image restoration processing represented by the Wiener filter and the image restoration processing of iterative processing represented by the RL method. The PSF can be used to generate a learned image for deep learning (DL) which has recently been developed.

Coefficient Data

Next follows a description of the coefficients used to generate the unsharp mask USM. As described above, each embodiment uses the PSF of the imaging optical system as an unsharp mask. Then, since the PSF of the imaging optical system varies depending on an imaging condition, such as an image height, a focal length, an F-number, and an imaging distance, it is necessary for the sharpening to generate an unsharp mask that matches imaging condition. In order to change the unsharp mask in accordance with the PSF which varies depending on the imaging condition, one conceivable method is to calculate all combinations and to select a PSF corresponding to the imaging condition. However, this method is not desirable in view of the processing speed in applying the unsharp mask and in storage capacity for saving the data.

Therefore, each embodiment saves coefficient data (coefficient data) for approximating the PSF of the imaging system, and uses the coefficient data to reconstruct (approximate) the (discretized) PSF in creating the unsharp mask. This configuration can maximize the sharpening effect while reducing a data amount to be stored. Each embodiment uses a continuous function and its coefficient data, as a method for approximating the PSF and for creating the unsharp mask, as described below.

Next follows a description of a continuous function used to approximate the PSF of the imaging optical system. As described above, in fitting a celestial body photometered in the field of astrophysics, the function P (x, y) represented by the following Expression (5) called a Moffat function is frequently used.

$$P(x, y) = \left(1 + \frac{x^2 + y^2}{\alpha^2}\right)^{-\beta} \tag{5}$$

Herein, $\alpha$ and $\beta$ in Expression (5) are coefficients and, in particularly, P(x, y) with $\beta=1$ is called a Lorentz function. For example, in modeling the PSF using Expression (5), the coefficients $\alpha$ and $\beta$ are obtained by fitting the distribution of PSF measured or calculated by Expression (5). Then, the PSF can be modeled based on the calculated coefficients $\alpha$ and $\beta$ and Expression (5). While the approximated PSF can be created based on Expression (5), Expression (5) is a function that can express only a rotationally symmetric distribution for the coordinates x and y. Thus, a rotationally asymmetric distribution or an N-fold rotationally symmetric distribution (where N is an integer) cannot be created with Expression (5).

Expression (6) (and (6a)) is called an Elliptical Moffat function that can express an elliptical shape (or a distribution of the two-fold rotationally symmetry) as a function obtained by modifying Expression (5).

$$P(x, y) = \left[1 + \frac{1}{\alpha^2}\left(X^2 + \frac{Y^2}{\gamma^2}\right)\right]^{-\beta} \tag{6}$$

$$\begin{bmatrix} X \\ Y \end{bmatrix} = \begin{bmatrix} \cos\theta & \sin\theta \\ -\sin\theta & \cos\theta \end{bmatrix} \begin{bmatrix} x \\ y \end{bmatrix} \tag{6a}$$

In Expression (6), $\alpha$, $\beta$, and $\gamma$ are coefficients. Expression (6a) is a rotation matrix with respect to an angle $\theta$. Expressions (6) and (6a) can be summarized and expressed as in the following Expression (7).

$$P(x,y)=(\sigma+ax^2+2bxy+cy^2)^{-\beta} \tag{7}$$

In Expression (7), a, b, c, $\sigma$, and $\beta$ are coefficients. In order to maintain the elliptical shape in using Expression (7), it is necessary to satisfy a relationship of $b^2-ac<0$ for the coefficients a, b, and c.

Use of Expression (7) (or Expression (6)) can reproduce the distribution of the elliptical shape which cannot be represented by the function of Expression (5) and the correction becomes more accurate than that with the function of Expression (5). However, even when the function of Expression (7) is used for fitting to the PSF of the imaging optical system, a complicated shape, such as an asymmetric aberration and a sagittal halo, cannot be reproduced. In other words, use of Expression (7) can express a distribution having a rotational symmetry or the N-fold rotation symmetry but a rotationally asymmetric distribution cannot be expressed.

Accordingly, each of the embodiments uses a function represented by the following Expressions (8) ((8a)-(8c)) as reproducible functions of the PSF having the complicated shape, such as the asymmetric aberration and the sagittal halo of the imaging optical system.

When $x\geq0$ and $y\geq0$, $$P(x,y)=(\sigma+ax^2+2bxy+cy^2)^{-\beta}-e \tag{8a}$$

When $x\geq0$ and $y<0$, $$P(x,y)=(\sigma+ax^2+2bdxy+cd^2y^2)^{-\beta}-e \tag{8b}$$

When $x<0$, $$P(x,y)=P(-x,y) \tag{8c}$$

In Expressions (8), a, b, c, d, e, $\sigma$, and $\beta$ are coefficients. Similar to Expression (7), the coefficients a, b, and c in Expressions (8) need to satisfy the relationship of $b^2-ac<0$.

FIGS. 10A to 10F are illustrative distribution shapes that can be expressed by a function based on Expressions (8). FIG. 10A illustrates a rotationally symmetrical distribution in the XY coordinates, which can be expressed by any of functions of Expressions (5) to (8). When the imaging optical system is a coaxial system and the image point is located on the optical axis, the PSF also becomes rotationally symmetric. Therefore, the distribution shape of FIG. 10A can be expressed by the function of any one of Expressions (5) to (8).

FIGS. 10B and 10C illustrate distributions of an elliptical shape (referred to as "elliptical distributions" hereinafter) in which a long axis and a short axis of the ellipse overlap the X axis and the Y axis. These elliptical distributions cannot be expressed by the function of Expression (5), and the approximation accuracy improves with any one of the functions of Expressions (6) to (8). FIG. 10D illustrates the elliptical distribution where none of the major axis and the minor axis of the ellipse overlap the X axis or the Y axis, and this elliptical distribution cannot be represented by the functions of Expressions (5) and (6). This elliptical distribution can be accurately approximated with either of the function of Expression (7) or (8).

FIGS. 10E and 10F illustrate distributions that are symmetrical with respect to the Y axis (or in the X direction) and asymmetrical with respect to the X axis (or in the Y direction). The distribution shape in FIG. 10E corresponds to a distribution in which a portion on the +X side from the Y axis in the elliptical distribution illustrated in FIG. 10D is folded on the −X side with respect to the Y axis. The distribution shape in FIG. 10F is a portion above the X axis is made line-symmetrical with respect to the Y axis and a portion below the X axis is made concentrically semicircular in an elliptical distribution in which the long axis overlaps the Y axis and the short axis does not overlap the X axis. The functions of Expressions (5) to (7) cannot represent a line-symmetric distribution shape like FIGS. 10E and 10F. On the other hand, the function of Expression (8) used for this embodiment can express a rotationally asymmetric distribution, and is used to accurately approximate the distribution shape illustrated in FIGS. 10E and 10F.

As described above, the PSF at the image point on the optical axis in the imaging optical system has a rotationally symmetric distribution shape, but that is not the case at the off-axis image point within the plane (image plane) orthogonal to the optical axis. When the imaging optical system is a coaxial optical system, the PSF even at the off-axis image point has a symmetrical distribution shape in the direction (sagittal direction) orthogonal to a direction (meridional direction) of a line that extends from the image point to the optical axis in the image plane. Thus, the PSF of the imaging optical system does not always have a rotationally symmetric distribution shape, but is symmetrical in the sagittal direction. A complicated asymmetric aberration can be corrected by setting the x direction (the X direction in FIGS. 10E and 10F) in Expression (8) to the sagittal direction and the y direction (the Y direction in FIGS. 10E and 10F) to the meridional direction.

Next follows a detailed description of each coefficient in Expression (8). The coefficients a, b, and c among the coefficients in Expression (8) are used to generate an elliptical distribution in which none of the major axis and the minor axis overlap the X axis or the Y axis as illustrated in FIG. 10D. The asymmetry in the X and Y directions of the elliptical distribution can be controlled by controlling these coefficients a, b, and c. In addition, this method can express an elliptical distribution, as illustrated in FIGS. 10E and 10F, in which at least one of the major axis and the minor axis is set to an axis other than the X and Y axes and the distribution is made symmetrical only with respect to the Y axis, or an aberration such as the sagittal halo, which is hard for another function to express.

The coefficient d is used to make asymmetrical the elliptical distribution in the Y direction (specific direction), and controlling the coefficient d can correct the asymmetric aberration in the meridional direction. For example, the approximation accuracy for the coma (aberration) can be improved by controlling the coefficient d.

The coefficients e, σ, and β are used to control the spread of the elliptical distribution. The approximation accuracy can be improved by increasing the coefficient σ when the elliptical distribution to be approximated has a wide spread and by increasing the coefficient β when the shape of the elliptical distribution to be approximated abruptly changes near the peak. The coefficient e is used to limit the spread of the elliptical distribution. When the coefficient e is 0, the elliptical distribution gradually approaches to P(x, y)=0 on the peripheral side based on Expression (8). Therefore, when the elliptical distribution has a narrow spread, the approximation accuracy can be improved by setting the coefficient e to be larger than 0.

In order to approximate the PSF of the imaging optical system, the elliptical distribution needs to be P(x, y)≥0. Therefore, when e>0, P(x, y)<0 in the peripheral part, but then it is only necessary to clip and set P(x, y)=0.

Figure 11:
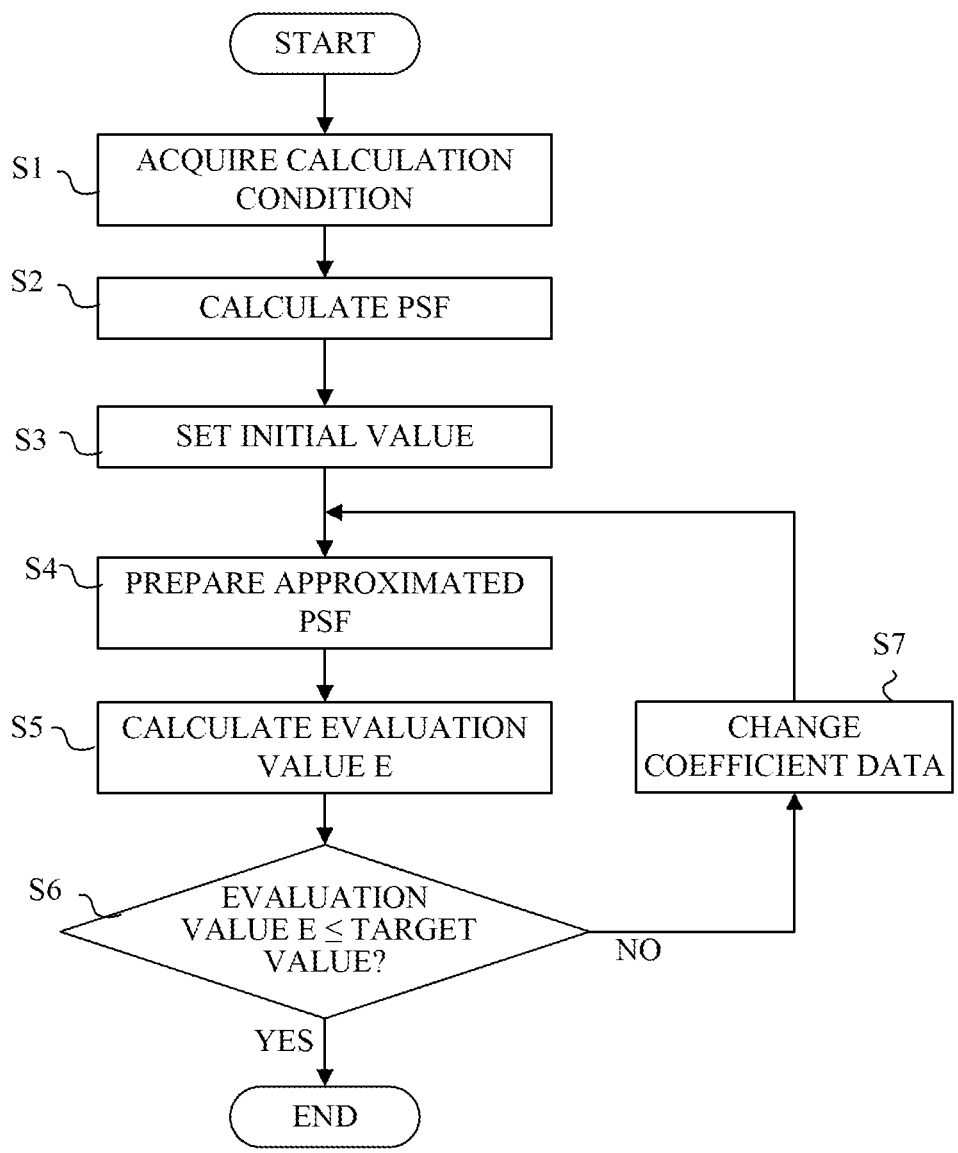
FIG. 11 is a flowchart illustrating a method of calculating coefficients according to each embodiment.

Referring now to FIG. 11, a description of a method of calculating the coefficient data. FIG. 11 is a flowchart illustrating a method of calculating the coefficient data. Each embodiment calculates a coefficient (coefficient data) for generating an unsharp mask using the designed value of the imaging optical system 101.

First, in the step S1, information necessary to calculate the coefficients is acquired. More specifically, the imaging condition in imaging for generating a captured image as a target for calculating the coefficient, and a target value (a threshold of an evaluation value E) corresponding to a shift between the PSF (designed PSF) of the imaging optical system 101 and the approximated PSF.

Figure 12:
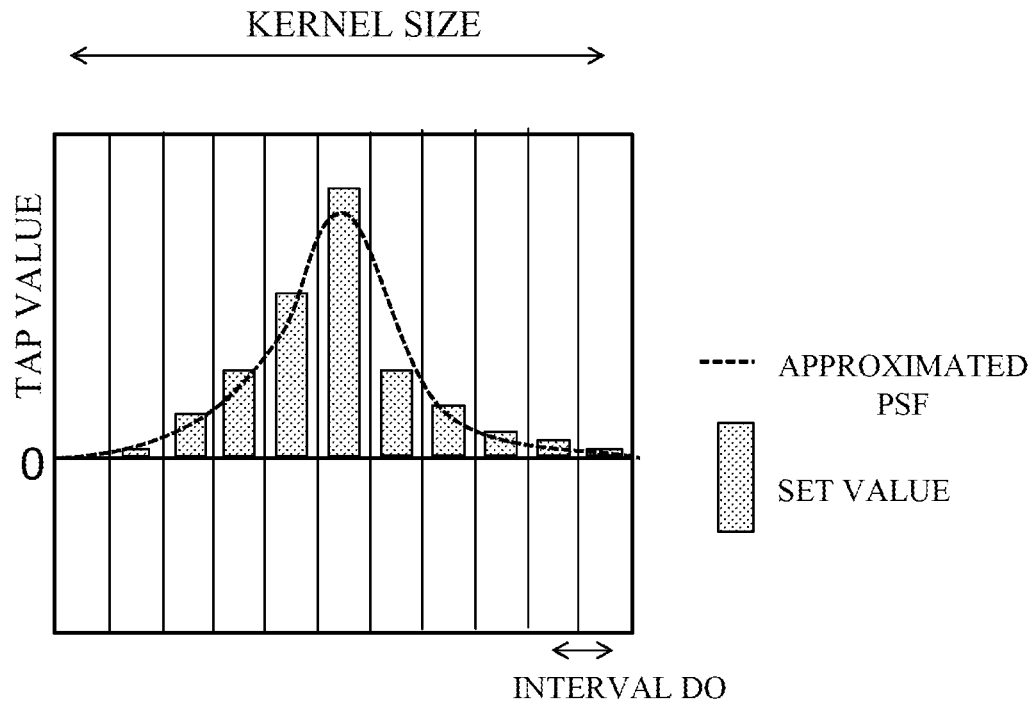
FIG. 12 illustrates the approximated PSF and designed values according to each embodiment.

Subsequently, in the step S2, the designed PSF is calculated based on the designed value data of the imaging optical system 101 corresponding to the imaging condition acquired in the step S1. FIG. 12 illustrates a section of the designed PSF calculated in the step S2 and the approximated PSF generated in the step S4 described later. As illustrated in FIG. 12, the designed PSF calculated in the step S2 is discretized with a division number (tap number) N and an interval (discretization interval or sampling pitch) Do. The size (kernel size) of the designed PSF can be expressed by the product of the interval Do and the tap number N, as is apparent from FIG. 12. In other words, if any two of the interval Do, the tap number N, and the kernel size are known in the discretized designed PSF, the remaining one is uniquely determined. For example, if the interval Do=2.0 μm and the tap number N=11, the kernel size Do×(N−1)=20 μm. Do×N may be called the kernel size, then it is 22 μm. The interval Do is the pitch in fitting and may be smaller than the pixel pitch in the existing image sensor. The previous fitting with a small pixel pitch is applicable to the image sensors of various pixel pitches. While the designed value data of the imaging optical system 101 is used for fitting, data may be used which is obtained by imaging a chart or the like and by estimating the PSF of the imaging optical system 101 based on the captured image.

Next, in the step S3, initial values are set to the coefficients a, b, c, d, e, σ, β in approximating the PSF. Since each coefficient is updated (converted) in the subsequent processing, the step S3 sets a temporary value as an initial value.

Next, the step S4 creates the approximated PSF by substituting coefficients for Expression (8) and by approximating the PSF. This processing discretizes the approximated PSF in order to derive the optimum coefficient by performing fitting for the designed value. The number of divisions and intervals in the discretization are adjusted to the designed PSF calculated in the step S2.

Next, the step S5 evaluates the shift between the designed PSF calculated in the step S2 and the approximated PSF created in the step S4. As an index in evaluating the shift between the designed PSF and the approximated PSF, for example, a root mean square of a difference between the designed PSF and the approximated PSF is calculated and used as the evaluation value E. The smaller the evaluation value E is, the closer to the designed PSF the approximated PSF is.

Next, the step S6 makes a determination using the evaluation value E calculated in the step S5 and the target value acquired in the step SL. The evaluation value E may include not only information on the shift between the designed PSF and the approximated PSF but also information on the coefficients of the approximated PSF. This embodiment uses Expression (8) as a function (model) for approximating the PSF, but as described above, the coefficients a, b, and c must satisfy the relationship $b^2-ac<0$. Hence, when the coefficients a, b, and c do not satisfy this relationship or satisfy $b^2-ac \geq 0$, a desired result cannot be obtained and setting a weight so as to increase the evaluation value E can more efficiently provide fitting. Where there is a restriction on a range that each coefficient can take, the evaluation value E is similarly changed, the fitting can become efficient, and the accuracy improves.

In the step S6, the thus-calculated evaluation value E is compared with a preset target value. When the evaluation value E is equal to or less than the target value, the fitting or the generation of the approximated PSF is completed, and the coefficient data that provides the approximated PSF is output. On the other hand, when the evaluation value E exceeds the target value, the fitting has not yet been fully performed and the flow proceeds to the step S7.

In the step S7, the coefficient (coefficient data) is changed (updated). Then, only one coefficient may be updated or a plurality of coefficients may be updated. After the coefficient is updated, the flow returns to the step S4, the approximated PSF is calculated again, and the evaluation value E is calculated in the step S5. Then, in the step S6, the processing from the step S4 to the step S7 is repeated until the evaluation value E converges below the target value. Unless the updated evaluation value E is smaller than the evaluation value E before the coefficient is updated, the flow may return to the pre-update coefficient and restart the processing from the step S4, or return to the step S3 so as to escape from the local solution and reset the initial value.

Through the above calculation processing of the coefficients (coefficient data), the PSFs for various imaging conditions and for the various imaging optical systems (if exchangeable) 101 are previously converted into coefficients, and the data (coefficient data) can be stored in the memory 112. When the coefficients for the approximated PSF are previously calculated in this manner, the approximated PSF according to the imaging optical system 101 and imaging conditions can be reconstructed (reproduced) only by acquiring the calculated coefficient data in the stage of the sharpening processing.

Frequency Characteristic

Next follows a description of a control over the frequency characteristic in the unsharp mask processing. Expression (1) can be Fourier-transformed into a display format in the frequency space as in Expression (9) below.

$$G(u,v)=F(u,v)+m \times H(u,v) \quad (9)$$

In Expression (9), H (u, v) is a function obtained by Fourier-transforming a correction component h(x, y), and G(u, v) and F(u, v) are functions obtained by Fourier-transforming a sharpened image g(x, y) and an original image f(x, y), respectively. (u, v) is a coordinates on the two-dimensional frequency plane or a frequency. H(u, v) can be converted into the following Expression (10) by Expression (2).

$$H(u,v)=F(u,v)-F(u,v) \times U(u,v) \quad (10)$$

In Expression (10), U(u, v) is a function obtained by Fourier-transforming the unsharp mask USM(x, y). Similarly, H(u, v) can be converted into the following expression (11) by Expression (3).

$$H(u,v)=F(u,v) \times (1-U(u,v)) \quad (11)$$

G(u, v) is converted into the following Expression (12) by substituting Expression (10) for Expression (9).

$$G(u,v)=F(u,v)+m \times \{F(u,v)-F(u,v) \times U(u,v)\} \quad (12)$$

Similarly, G (u, v) can be converted into the following Expression (13) by substituting Expression (11) for Expression (9).

$$G(u,v)=F(u,v)+m \times F(u,v) \times \{1-U(u,v)\} \quad (13)$$

Expression (13) can be modified as follows.

$$G(u,v)=F(u,v) \times \{1+m \times (1-U(u,v))\} \quad (14)$$

Expressions (12) to (14) are equivalent with one another because they can be derived through the modification, although they are different in processing order and the like. Hence, whichever of Expressions (12) to (14) is used, the parentheses { } in Expression (14) corresponds to a change in the frequency characteristic before and after the unsharp mask processing. In other words, the absolute value of the bracket { } is the gain (sharpening degree) of the filter in the unsharp mask processing, and represents the sharpening effect in the frequency space of the unsharp mask processing.

Figure 15:
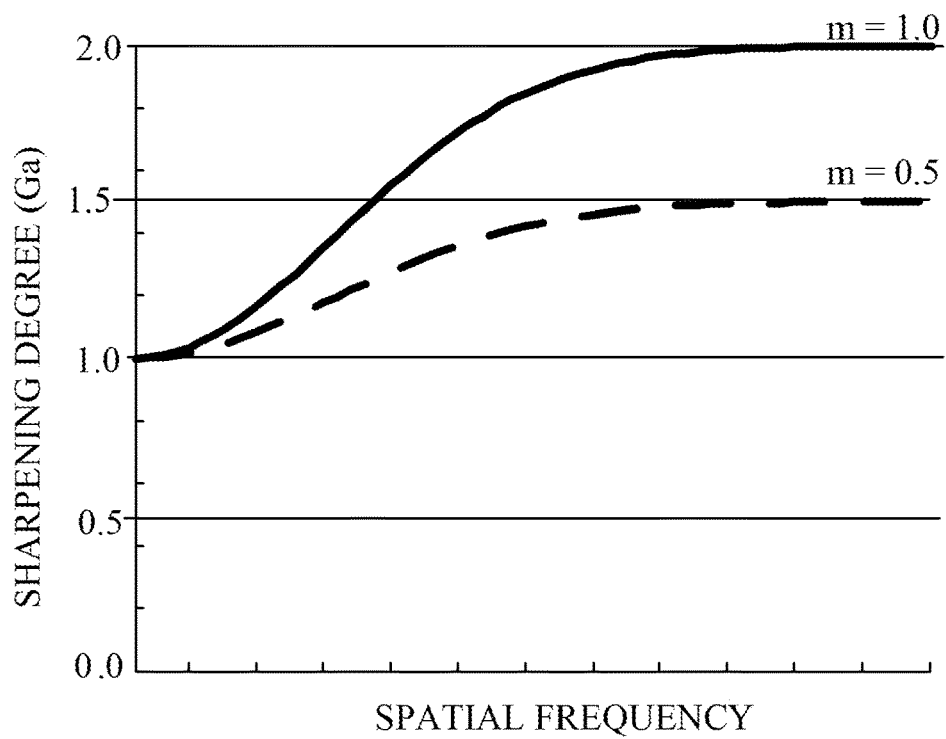
FIG. 15 explains a change of an amplitude component MTF by sharpening discretization processing.

FIG. 15 explains the change of the amplitude component MTF by the sharpening processing and illustrates one section of the absolute value of the bracket { } in Expression (14). In FIG. 15, the abscissa axis represents the spatial frequency and the ordinate axis represents the gain Ga. In FIG. 15, a broken line corresponds to m=0.5 and a solid line corresponds to m=1.0, and they approach to the gain Ga=1.5 and Ga=2.0 on the high frequency side, respectively. Now assume that Re(U(u, v)) is a real part and Im(U(u, v)) is an imaginary part of the frequency characteristic U(u, v) of the unsharp mask USM. Then, the gain Ga in the unsharp mask processing is expressed by the following Expression (15).

$$Ga(u,v)=\sqrt{(1+m-mRe(U(u,v)))^2+m^2 Im(U(u,v))^2} \quad (15)$$

If the unsharp mask USM has a rotationally symmetric Gaussian distribution, U (u, v) that corresponds to its Fourier transform also has a Gaussian distribution, Im(U(u, v))=0 and $0 \leq Re(U, v)) \leq 1$ are established, the gain Ga satisfies $1 \leq Ga(u, v) \leq (1+m)$. The real part Re(U(u, v)) of U(u, v) also approaches to zero because the value of the Gaussian distribution approaches to zero as the frequency separates from the center of the distribution. The gain Ga(u, v) approaches to (1+m) as the frequency moves to the higher frequency side, and becomes a curve as illustrated by the solid line or broken line in FIG. 15.

Next follows a description of the PSF of the imaging optical system used for the unsharp mask USM. In this case, U(u, v) is the optical transfer function ("OTF") which is the Fourier transform of the PSF. The absolute value of the OTF or the amplitude component is called Modulation Transfer Function ("MTF").

Figure 16:
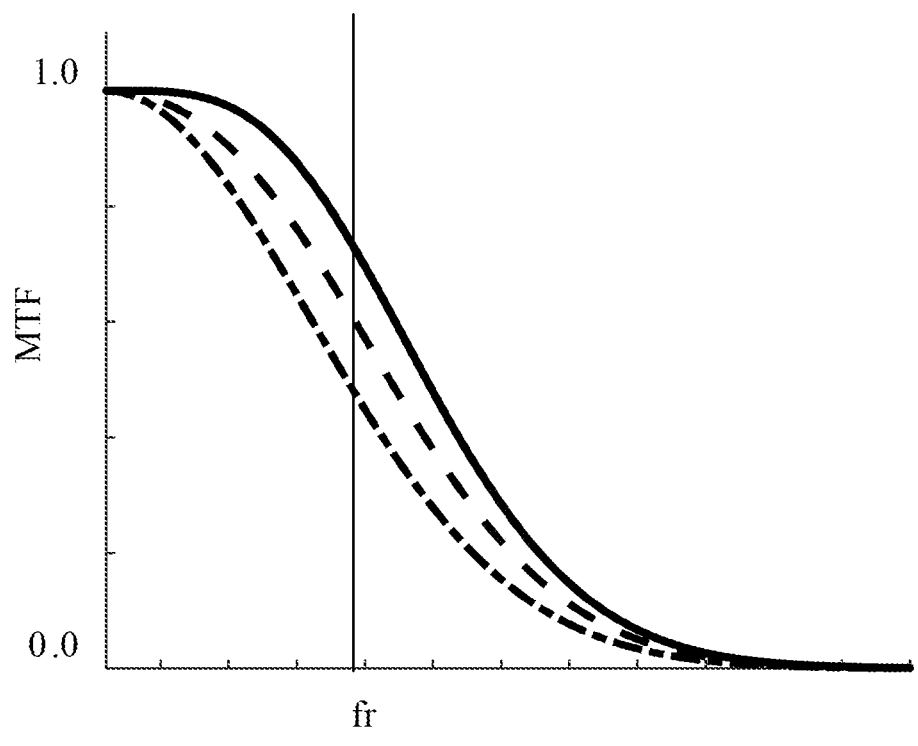
FIG. 16 explains frequency characteristics before and after the sharpening processing.

FIG. 16 illustrates a change in the MTF before and after sharpening by the unsharp mask processing. In FIG. 16, the abscissa axis represents the spatial frequency and the ordinate axis represents the MTF. An alternate short and long dashed line in FIG. 16 corresponds to the MTF (MTF before sharpening) of the imaging optical system, and a solid line and a broken line represent the MTF after the unsharp mask processing is executed corresponding to the solid line and the broken line in FIG. 15, respectively. As illustrated in FIG. 16, in general, the MTF of the imaging optical system is high on the low frequency side and low on the high frequency side. In addition, when the MTF of the imaging optical system approaches to zero, both the real part and imaginary part of the OTF approach to zero and when the MTF exceeds the resolvable limit frequency in the imaging optical system, Re(U(u, v))=0 and Im(U(u, v))=0. Since the gain Ga(u, v)=(1+m) from Expression (15), the PSF of the imaging optical system used for the unsharp mask USM causes the gain Ga to increase on the high frequency side, as illustrated by a solid line or a broken line in FIG. 15. The PSF of the imaging optical system makes the off-axis PSF rotationally asymmetric and thus the gain Ga(u, v) rotationally asymmetric. The gain Ga(u, v) is constant in any direction (section) for the rotationally symmetric PSF, and varies depending on the direction for the rotationally asymmetric PSF. When the PSF of the imaging optical system is used for the unsharp mask USM, the real part and the imaginary part of the OTF of the imaging optical system may exhibit minus and the gain Ga(u, v) may be larger than (1+m) in some cases (Ga(u, v)>(1+m)).

Figure 17:
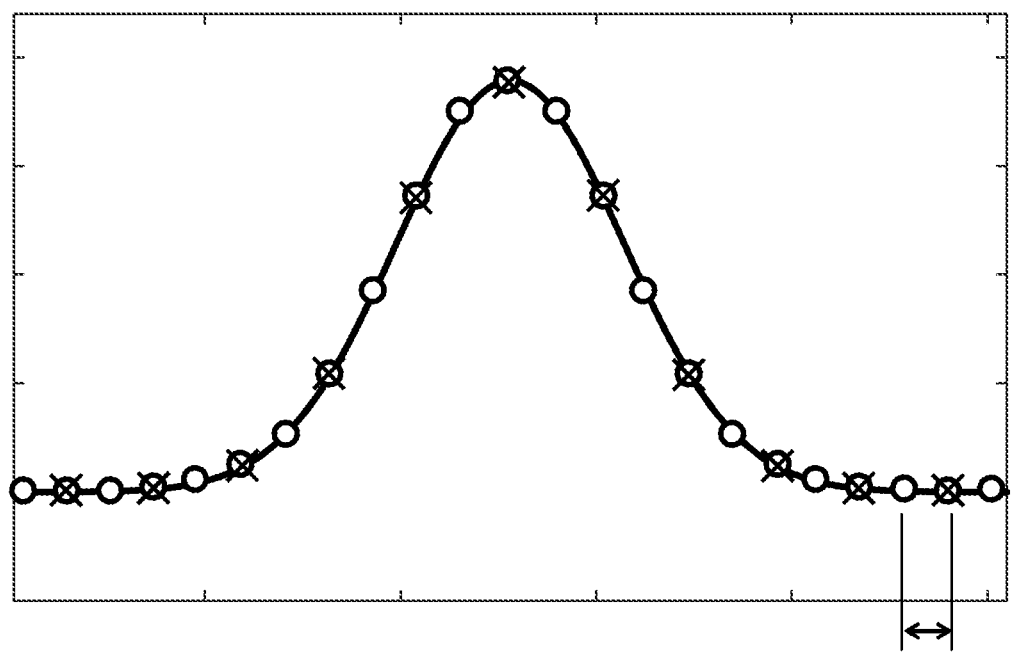
FIG. 17 explains a relationship between a continuous function and a discretization interval.
Figure 18:
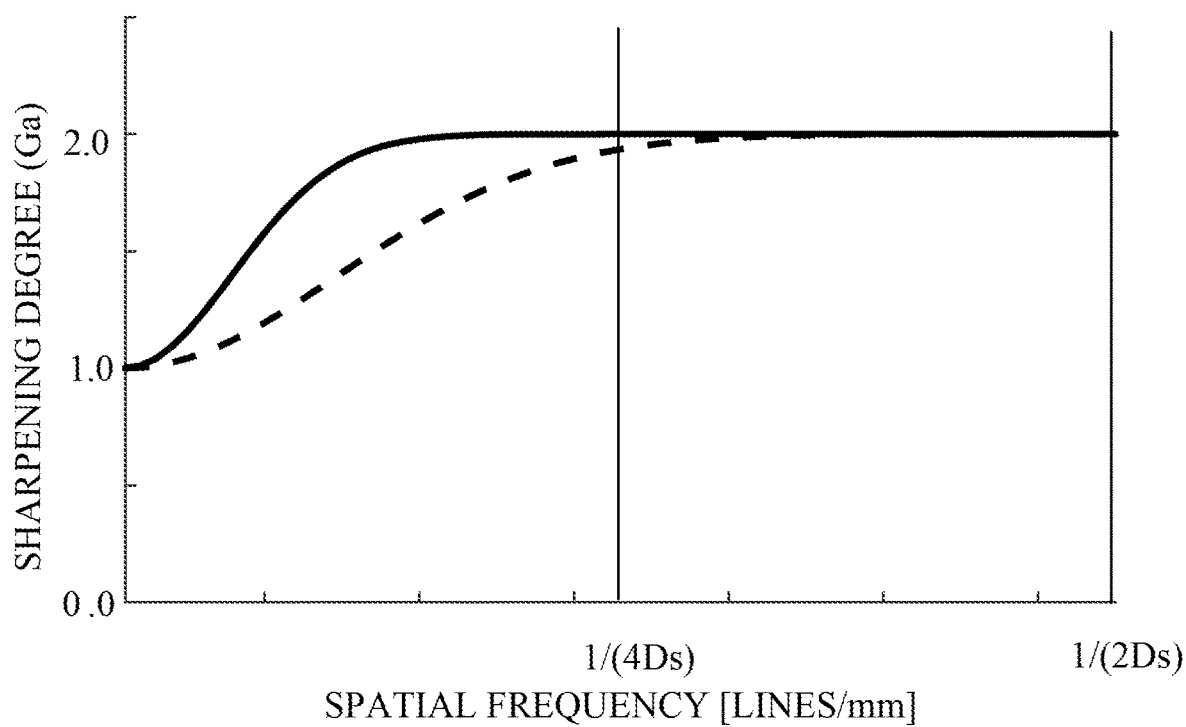
FIG. 18 explains a relationship between the discretization interval and the frequency characteristic.

Referring now to FIGS. 17 and 18, a description will now be given of a relationship between the discretization of the continuous function and the frequency characteristic. FIG. 17 explains the relationship between the continuous function and the discretization interval (sampling pitch), and is a sectional view of the continuous function corresponding to the approximated PSF and the discretized data. In FIG. 17, the abscissa axis represents a coordinate (pixel position), and the ordinate axis represents a luminance. In FIG. 17, the solid line is a continuous function, the white dot is approximated PSF data discretized at intervals Ds, and the cross mark is approximated PSF data discretized at intervals 2Ds. FIG. 18 explains a relationship between the discretization interval and the frequency characteristic, and schematically illustrates the frequency characteristic of the filter in the unsharp mask processing using the approximated PSF data in FIG. 17. In FIG. 18, the abscissa axis represents a spatial frequency and the ordinate axis represents a gain Ga.

In FIG. 18, a solid line represents the frequency characteristic of the filter corresponding to the approximated PSF data of the white dot in FIG. 17, and a broken line represents the frequency characteristic of the filter corresponding to the approximated PSF data of the cross mark. When the solid line and the broken line in FIG. 18 are compared with each other, the characteristic on the low frequency side are particularly different and the filter on which the PSF data is created with the discretization at smaller intervals provides a higher gain Ga on the low frequency side.

Now assume that Ds is a pixel pitch of the image sensor 104. Then, the white dot in FIG. 17 represents the PSF data discretized at the same intervals as the pixel pitch of the image sensor 104, and the cross mark represents the PSF data discretized at intervals twice as long as the pixel pitch. Then, the Nyquist frequency of the image sensor 104 is 1/(2Ds) [lines/mm], and the solid line in FIG. 18 corresponds to the frequency characteristic up to the Nyquist frequency of the image sensor 104. On the other hand, sampling at intervals twice as long as the pixel pitch of the image sensor 104 makes the frequency characteristic lower than the original one as illustrated by the broken line in FIG. 18.

Conversely, assume that 2Ds is the pixel pitch of the image sensor 104. Then, the white dot in FIG. 17 represents the PSF data discretized at intervals half the pixel pitch of the image sensor 104, and the cross mark represents the PSF data discretized at the same interval as the pixel pitch. Then, the Nyquist frequency of the image sensor 104 becomes 1/(4Ds) [lines/mm], and the broken line in FIG. 18 corresponds to the frequency characteristic up to the Nyquist frequency of the image sensor 104. On the other hand, sampling at intervals half the pixel pitch of the image sensor 104 makes the frequency characteristic higher than the original one as illustrated by the solid line in FIG. 18. In other words, the frequency characteristic can be changed by setting the interval (discretization interval) different from the pixel pitch in discretizing the continuous function. When the discretization interval is larger than the pixel pitch, the gain Ga becomes small. When the discretization interval is smaller than the pixel pitch, the gain Ga becomes large. In other words, as the discretization interval increases, the spread of the distribution of the generated approximated PSF data decreases, thereby Re(U(u, v)) increases, and Ga(u, v) becomes smaller based on Expression (15). Conversely, as the discretization interval decreases, the spread of the distribution of the generated approximated PSF data increases, thereby Re(U (u, v)) decreases, and Ga(u, v) becomes larger based on Expression (15).

In FIG. 18, the frequency characteristic of the solid line up to 1/(4Ds) [lines/mm] and the shape of the frequency characteristic of the broken line up to 1/(2Ds) [lines/mm] accord with each other. If the pixel pitch is Ds and the discretization is made at intervals twice as long as that of the cross mark in FIG. 17, the frequency characteristic of the filter can be obtained by changing the scale of the abscissa axis so that 1/(8Ds) [lines/mm] can be the Nyquist frequency for the solid line in FIG. 18 (or by quadrupling the abscissa axis).

The gain Ga can be multiplied by m in the ordinate axis direction by changing the adjustment coefficient m, whereas the adjustment with the discretization interval can provide the effect of changing the scale in the abscissa axis direction. This embodiment realizes an accurate control over the frequency characteristic in the unsharp mask processing by adjusting the discretization interval of the PSF. Specific embodiments will be described below.

First Embodiment

Figure 2:
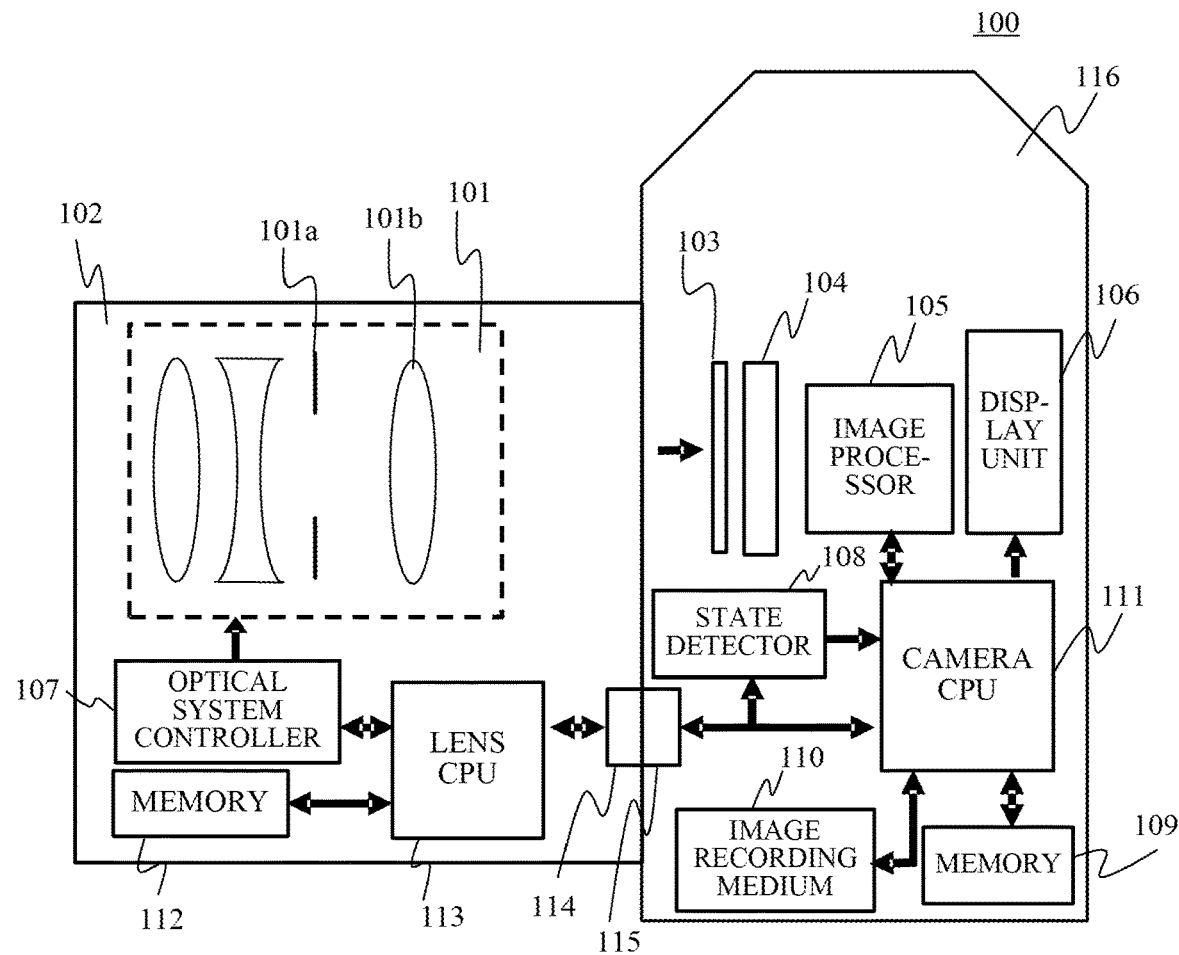
FIG. 2 is a block diagram of an imaging apparatus according to each embodiment.

Referring now to FIG. 2, a description will be given of an imaging apparatus according to a first embodiment of the present invention. FIG. 2 is a block diagram of the imaging apparatus 100 according to this embodiment. The imaging apparatus 100 includes a camera body (imaging apparatus body) 116 and an interchangeable lens (lens apparatus) 102 attachable to the camera body 116. In the camera body 116, a program for the sharpening processing (image processing method) to an input image (captured image) is installed in the memory (or storage unit) 109, such as a ROM (memory) or a hard disk drive, and the sharpening processing is performed by an image processor (image processing apparatus) 105. Instead of the memory 109, the program of the image processing method according to this embodiment may be storage in a storage unit inside the image processor 105. A circuit corresponding to the program may be designed, and the sharpening processing may be executed by operating the circuit.

The interchangeable lens 102 includes an imaging optical system 101, an optical system controller 107, a memory (or storage unit) 112, a lens CPU 113, and a contact unit 114. The imaging optical system 101 includes an aperture stop (or diaphragm) 101a and a focus lens 101b. In this embodiment, the interchangeable lens 102 is interchangeable to the camera body 116. However, this embodiment is not limited to this example and is applicable to an imaging apparatus integrated with the camera body 116. The memory 112 is a rewritable nonvolatile memory. The data stored in the memory 112 mainly includes information on an optical characteristic unique to the interchangeable lens 102. The camera body 116 acquires this information from the interchangeable lens 102 and corrects the captured image based on the acquired information.

The memory 112 stores the coefficient data used to reconstruct (approximate) the PSF of the imaging optical system 101 and information on the PSF such as the adjustment coefficient m. The information is transmitted via the contact units 114 and 115 from the interchangeable lens 102 to the camera body 116 by communications. The camera body 116 generates a filter based on the information on the PSF transmitted from the interchangeable lens 102, executes the correction processing, and generates a sharpened image. The information on the PSF may be stored in the memory 109 in the camera body 116. When the interchangeable lens 102 is attached to the camera body 116, the coefficient data and the like stored in the memory 112 in the initial communication can be transferred to and stored in the memory 109 via the lens CPU 113 and the camera CPU 111. In this embodiment, the information on the PSF such as the coefficient data and the adjustment coefficient m stored in the memory 112 or the memory 109, is information corresponding to the imaging optical system 101 in the interchangeable lens 102.

The lens CPU 113 serves as a communication circuit (communicator) for communications between the interchangeable lens 102 and the camera body 116, reset exception processing, an A/D converter, a timer, an input/output port, a built-in ROM, and a built-in RAM. The communication circuit communicates between the interchangeable lens 102 and the camera body 116 by a communication method including control information corresponding to an imaging mode (motion imaging mode, still imaging mode). The optical system controller 107 is a lens controller that controls each component in the interchangeable lens 102, and driving of an optical element, such as a lens and a diaphragm, based on the instruction from the lens CPU 113 and control information obtained via the communication circuit. The contact unit 114 is a connector that includes a plurality of metal contacts for communications between the interchangeable lens 102 and the camera body 116, and electrically connects the lens CPU 113 and the camera CPU 111 to each other.

The camera body 116 includes an optical low-pass filter 103, the image sensor 104, the image processor 105, a display unit 106, a state detector 108, a memory 109, an image recording medium 110, a camera CPU 111, and a contact unit 115. The image sensor 104 is a two-dimensional image sensor, such as a CCD (Charge Coupled Device) sensor or a CMOS (Complementary Metal-Oxide Semiconductor) sensor. The image sensor 104 photoelectrically converts an object image (optical image, imaged light) obtained via the imaging optical system 101 and the optical low-pass filter 103 to generate a captured image. The object image is photoelectrically converted by the image sensor 104 and is converted into an analog signal (electric signal). The analog signal is converted into a digital signal by an unillustrated A/D, and the digital signal is input to the image processor 105.

The image processor 105 is an image processor that performs predetermined processing and predetermined unsharp mask processing for a digital signal. In this embodiment, the image processor 105 in the camera body 116 performs the sharpening processing, but a personal computer (PC) or a dedicated apparatus may perform the sharpening processing as an image processing apparatus. The image processor 105 acquires the imaging condition (imaging condition information) of the imaging apparatus 100 from the state detector 108. The imaging condition information is information on an image height, an aperture value (F-number), an imaging distance, and a focal length of the zoom lens. The state detector 108 can acquire the imaging condition information directly from the camera CPU 111, but the present invention is not limited to this example. For example, the imaging condition information on the imaging optical system 101 can be acquired from the optical system controller 107 via the lens CPU.

Figures 8, 9:
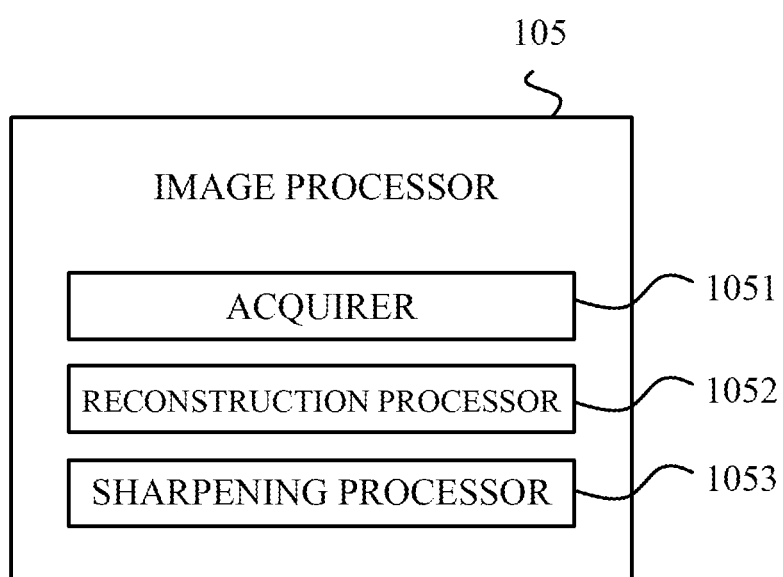
FIG. 8 schematically illustrates a Bayer array according to each embodiment.
FIG. 9 is a block diagram of the image processor according to each embodiment.

As illustrated in FIG. 9, the image processor 105 includes an acquirer 1051, a reconstruction processor 1052, and a sharpening processor 1053, and performs the image sharpening processing for an input image (captured image). The output image processed by the image processor 105 is stored in the memory 109 in a predetermined format. The memory 109 serves to store the relationship between the imaging condition of the imaging optical system 101 and the PSF of the imaging optical system. Where an image processing apparatus that executes unsharp mask processing is separate from the image processor 105, the camera CPU 111 may store aberration information in association with the captured image.

The display unit 106 can display an image obtained by performing predetermined processing for display use after the sharpening process. The display unit 106 may display an image obtained by performing simple processing for high-speed displaying. The series of above processing is controlled by the camera CPU 111.

The imaging optical system 101 may include an optical element, such as a low-pass filter and an infrared cut filter. Where an optical element is used that affects the PSF, such as a low-pass filter, the accurate sharpening processing is available when the influence of this optical element is considered in creating the unsharp mask. Even when an infrared cut filter is used, since each PSF of the RGB channel (RGB color component) which is the integral value of the PSF of the spectral wavelength, in particular, the PSF of the R channel is influenced, the influence may be considered in creating the unsharp mask.

Referring now to FIG. 1, a description will be given of an image processing method according to this embodiment. FIG. 1 is a flowchart illustrating the image processing method according to this embodiment. The flowchart illustrated in FIG. 1 can be implemented as a program (image processing program) that enables a computer to execute the function of each step. This is true of other flowcharts in other embodiments. Each step in FIG. 1 is executed by the image processor 105 based on a command from the camera CPU 111.

First, in the step S11, the image processor 105 (acquirer 1051) acquires a captured image as an input image generated via the optical system (imaging optical system 101). The color component data as a correction target used as the input image is, for example, G-channel image data after demosaicing. Alternatively, the R-channel image data, the B-channel image data, and all RGB-channel image data, or image data before demosaicing may be used.

FIG. 8 is a schematic diagram of a Bayer array as a discrete regular array. For example, the processing may be applied to the input image that is data of each channel of RGB or that is data of a particular channel. Alternatively, as illustrated in FIG. 8, the G channel may be divided into two or G1 and G2 so as to provide four channels in total. The configuration where the G channel is divided into two enables the image data for each of R, G1, G2, and B to have the same resolution, and facilitates image processing and data processing.

Next, in the step S12 in FIG. 1, the image processor 105 (acquirer 1051) acquires data (coefficient data) of the coefficients a, b, c, d, e, σ, and β of the function (predetermined function) in Expression (8) used to reconstruct the PSF of the imaging optical system 101 according to the imaging condition. In order to generate an approximated PSF corresponding to a certain image point, it is not always necessary to acquire data of all of these coefficients. For example, the above rotationally symmetrical shape is obtained for the on-axis PSF, and a=c, b=0 and d=1 are established.

The coefficient β is an exponential term and causes a heavy processing load when the coefficient β is made variable according to the PSF. Thus, P may be fixed to 1. When the coefficient β is fixed, a shape range that can be expressed becomes narrower than that when the coefficient β is not fixed but a coefficient data amount stored in the memory 112 or 109 and the processing load can be reduced. The number of coefficients may be increased in order to improve the approximation accuracy. For example, it is difficult to provide highly accurate fitting with a continuous function for the PSF having a narrowly spread distribution and a high peak, and thus the peak value or a value near the peak of the PSF may be directly set as the coefficient. The approximation accuracy can be improved by thus directly setting to the coefficient an area in which the distribution abruptly changes, and by setting the area to be reproduced with the function to another area. In the step S12, the image processor 105 (acquirer 1051) may acquire the adjustment coefficient m for the sharpening processing in addition to the coefficient data.

In addition, the step S12, the image processor 105 (acquirer 1051) acquire the coefficient data used to reconstruct the approximated PSF. Assume that the imaging apparatus 100 is a lens interchangeable type camera. Then, the pixel pitch in the image sensor 104 changes as the camera body 116 changes, and thus the processing according to the change of the pixel pitch is necessary.

Figure 19:
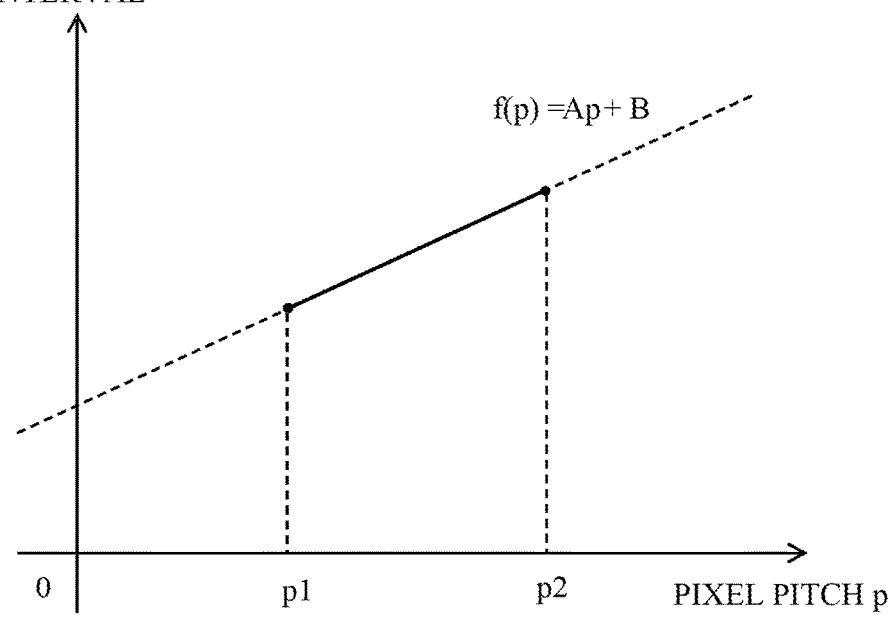
FIG. 19 illustrates a relationship between a pixel pitch and a discretization interval according to each embodiment.

Referring now to FIG. 19, a description will be given of processing when the pixel pitch changes and the imaging apparatus 100 is the lens interchangeable camera. FIG. 19 illustrates the relationship between the pixel pitch and the discretization interval. In FIG. 19, the abscissa axis represents the pixel pitch p, the ordinate axis represents the adjusted discretization interval sp, and the pixel pitches p1 and p2 represent the minimum pixel pitch and the maximum pixel pitch in the reconstruction. Where p is the pixel pitch and f(p) is the adjusted discretization function (discretization interval), f(p) can be expressed by a linear function as in the following Expression (16).

$$F(p) = Ap + B \quad (16)$$

In Expression (16), A and B are discretized coefficients (discretization adjustment coefficients) in the discretization. With Expression (16), the discretization coefficient A is a slope for the pixel pitch p and can be adjusted by a ratio to the pixel pitch p. As in the above example, when the discretization interval sp is twice as long as the pixel pitch p, the discretization coefficients A and B of the discretization function f(p) are A=2.0 and B=0.

The discretization coefficient B is independent of the pixel pitch, and all pixel pitches can be uniformly adjusted by setting the value of B while setting A=0. The discretization function (discretization interval) f(p) in Expression (16) is expressed as a linear function using the discretization coefficients A and B, but the linearity is not always necessary and a nonlinear power series function, an exponential function, a logarithmic function, etc. may also be used.

This embodiment adjusts the frequency characteristic of the filter using the adjustment coefficient m and the discretization adjustment coefficients A and B in order to realize accurate sharpening processing. Since the PSF of the imaging optical system varies according to the imaging condition, the step S12 acquires the discretization adjustment coefficients A and B corresponding to the imaging conditions of the input image. Since the PSF of the imaging optical system varies according to the position (image height) in the input image, the discretization adjustment coefficients A and B may also be made different according to the position (image height). The discretization coefficients A and B may be appropriately determined according to the performance of the lens and the like. Thus, the information on the discretization of the approximated PSF such as the discretization coefficients A and B may be stored in the storage unit 112 in the interchangeable lens 102.

Figure 7A:
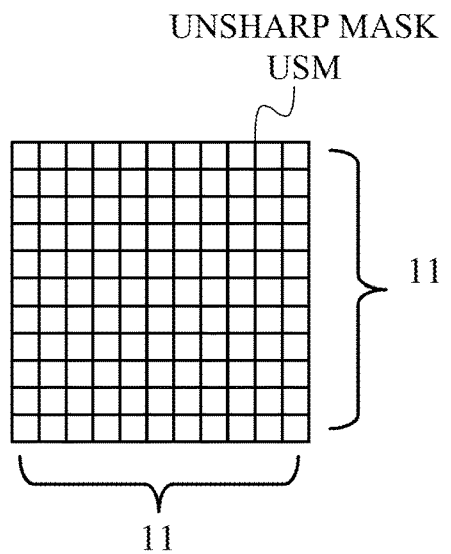
FIGS. 7A and 7B are a schematic view and a schematic sectional view of an unsharp mask according to each embodiment.
Figure 7B:
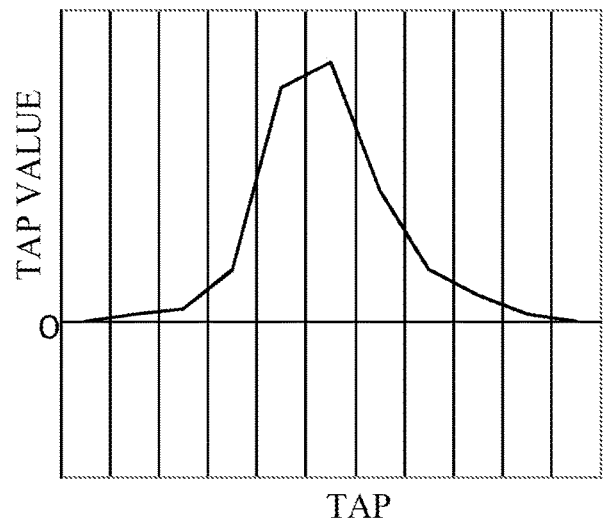

Next follows a description of the unsharp mask USM with reference to FIGS. 7A and 7B. FIG. 7A is a schematic view of the unsharp mask, and FIG. 7B is a schematic sectional view of the unsharp mask. The number of taps for the unsharp mask is determined depending on the aberration characteristics of the imaging optical system and the required sharpening accuracy. The unsharp mask USM illustrated in FIG. 7A is, for example, a two-dimensional mask having 11×11 taps. The unsharp mask USM illustrated in FIG. 7A is a two-dimensional filter in which filter coefficients are rotationally asymmetrically distributed.

FIG. 7A omits a value (corresponding to the filter coefficient) in each tap, and FIG. 7B illustrates one section of the unsharp mask. In FIG. 7B, the solid line represents the section of the unsharp mask USM, the abscissa axis represents the tap, and the ordinate axis represents the tap value. An ideal distribution of a signal value (PSF of the imaging optical system) that spreads due to the aberration is a distribution of each tap value (coefficient value) of the unsharp mask USM.

According to this embodiment, the image processor 105 generates the approximated PSF using the coefficient data, and an unsharp mask USM corresponding to the approximated PSF. Hence, a data amount to be stored can be much smaller while the correction accuracy is maintained than that where the data corresponding to the PSF of the imaging optical system 101 is directly stored. For example, as illustrated in FIGS. 7A and 7B, the unsharp mask USM with 11×11 taps needs to have data of 121 tap values. In order to separately store the RGB data, a data amount becomes a triple and it is necessary to store data of 363 tap values. On the other hand, when the coefficients are stored, Expression (8) has seven coefficients or twenty-one coefficients for the RGB colors. Thus, storing the coefficient data results in saving a storage data amount.

Next, in the step S13 in FIG. 1, the image processor 105 (reconstruction processor 1052) reconstructs the PSF (discretized PSF) with the coefficient data acquired in the step S12 (reconstruction processing). The PSF is reconstructed based on the coefficient data and Expression (8) as a function utilized to calculate the coefficient data, and this embodiment utilizes the reconstructed PSF as the unsharp mask.

Figure 14:
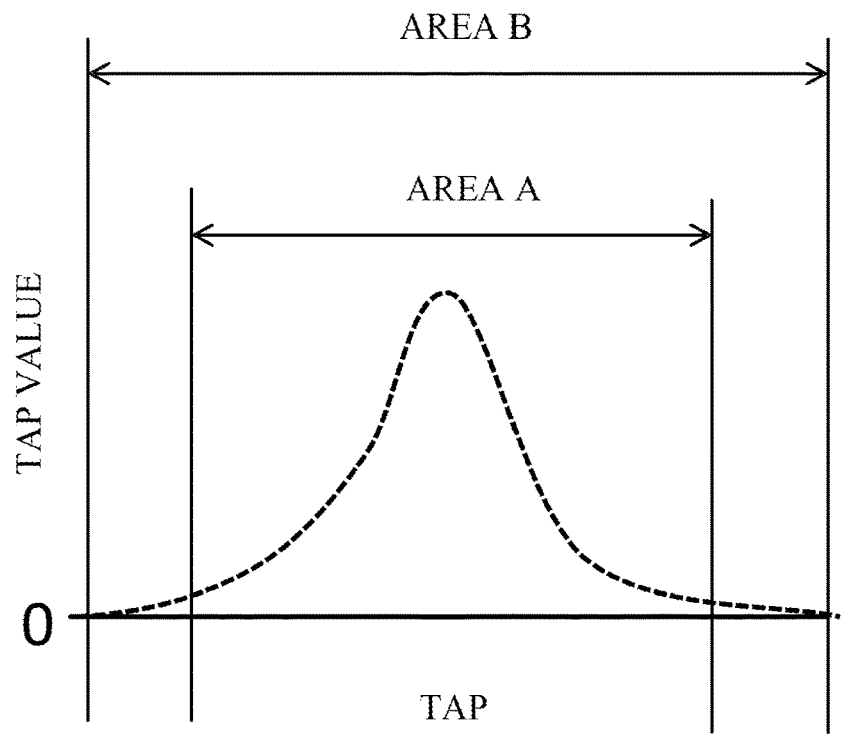
FIG. 14 is a sectional view of a reconstructed PSF.

FIG. 14 is a sectional view of the reconstructed PSF. In reproducing an area A as the unsharp mask in FIG. 14, the coefficients may be generated by fitting a little wider area B. Thereby, when a tap number and pitch are later changed through the interchangeable lens 102 etc., the change may be made so as to increase the number of areas.

This embodiment uses the discretization adjustment coefficient acquired in the step S12 to discretize the continuous function such as Expression (8). The discretization interval is obtained based on Expression (16) and the pixel pitch of the image sensor 104. This embodiment performs the sharpening processing so as to increase the gain on the higher frequency side through an adjustment using the discretization adjustment coefficients A and B and the adjustment coefficient m.

Figure 20A:
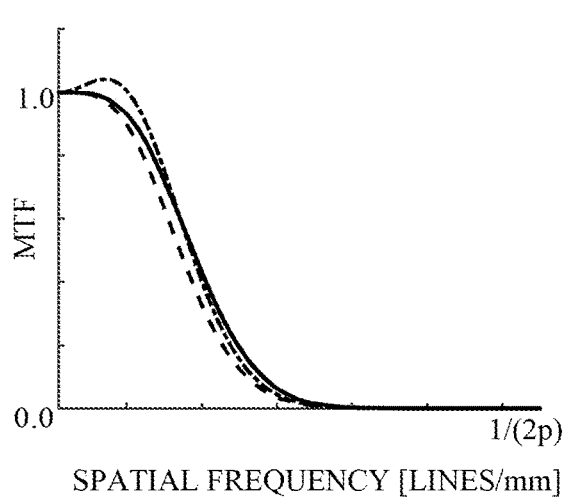
FIGS. 20A and 20B explain frequency characteristics before and after the sharpening processing.
Figure 20B:
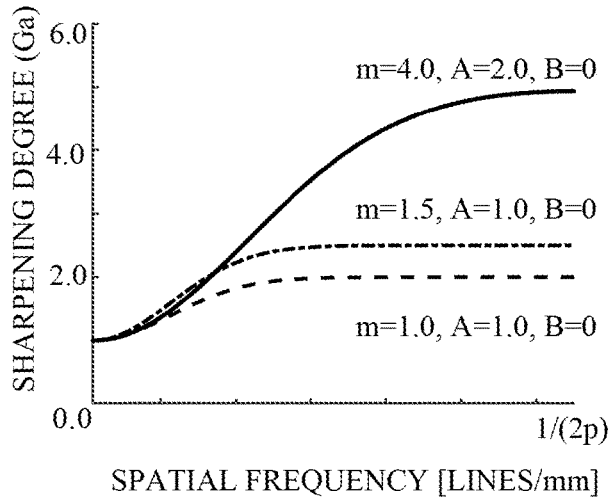

FIG. 20A illustrates the MTF characteristic after the unsharp processing. In FIG. 20A, the abscissa axis represents the spatial frequency and the ordinate axis represents the MTF. FIG. 20B illustrates the frequency characteristic of the filter in the unsharp mask processing, where the abscissa axis represents the spatial frequency and the ordinate axis represents the gain Ga. FIGS. 20A and 20B illustrate the characteristic of the pixel pitch p of the image sensor 104 up to the Nyquist frequency 1/(2p) [lines/mm]. Broken lines in FIGS. 20A and 20B are the results with the adjustment coefficient m=1.0 and the discretization adjustment coefficients A=1.0 and B=0, and the discretization interval f(p) after the adjustment of Expression (16) is the pixel pitch p. The alternate long and short dash lines in FIGS. 20A and 20B are different from the broken lines in only the adjustment coefficient m which is changed to 1.5. When the broken line and the alternate long and short dash line are compared with each other in FIG. 20A, the MTF of the alternate long and short dash line is higher than that of the broken line as a whole. In this manner, the MTF may be increased on the high frequency side by increasing the adjustment coefficient m.

The alternate long and short dash line in FIG. 20A has an area in which the MTF exceeds 1.0 on the low frequency side, which the MTF exceeding 1.0 inflicts an adverse effect such as ringing on the sharpened image. In other words, in order to increase the gain without any adverse effect, it is necessary to increase the gain only on the high frequency side. As described above, the adjustment coefficient m cannot provide this adjustment.

The solid lines in FIGS. 20A and 20B correspond to the adjustment coefficient changed to m=4.0, and the discretization adjustment coefficients changed to A=2.0 and B=0. Then, the discretization interval f(p) after the adjustment of Expression (16) is twice as long as the pixel pitch p. When the solid line, the broken line, and the alternate long and short dash line in FIG. 20A are compared with one another, the solid line shows that the MTF is 1.0 or less on the low frequency side and the MTF is the highest of the three on the high frequency side. When all curves in FIG. 20B are compared with one another, the solid line shows that the gain is low on the low frequency side and higher than the broken line and the dashed line on the high frequency side. Thus, adjusting the discretization adjustment coefficients A and B and changing the discretization interval can increase the gain on the higher frequency side.

In FIGS. 20A and 20B, the discretization adjustment uses only the discretization adjustment coefficient A, but can use only the discretization adjustment coefficient B or both of them. Since the performance of the imaging optical system varies according to the position (image height) in the image, these coefficients may be stored for each position (image height) in the image. In general, the performance of the imaging optical system is higher as the position is closer to the center of the image, and the performance in the periphery of the image is lower than that on the optical axis. Hence, for example, the gain on the high frequency side can be increased in the periphery in which the performance becomes lower, by increasing the discretization adjustment coefficient A or B as the position is closer to the periphery of the image, and by similarly increasing the adjustment coefficient m.

Next, the image processor 105 (reconstruction processor 1052) performs normalization processing for the discretized approximated PSF. The total value of data discretized from the continuous function at certain intervals differs according to the discretization interval and the tap number. However, when the discretized data is treated as the PSF, the sum total of the PSF data must be 1. The normalization processing according to this embodiment initially calculates the sum total of the tap values in the approximated PSF data. Next, the sum total of the calculated tap values is divided by the value of each tap in the approximated PSF data. Due to this division, the sum total of the tap values is always 1 for the approximated PSF data. This is used for the normalized approximated PSF data. Processing instead of the division may integrate a reciprocal of the sum total. Due to the influence of the decimal accuracy of the value stored in each tap, the sum total of the tap values may not be equal to 1 in the normalization, but a slight shift is permissible and this embodiment may provide an adjustment so that the sum total of the tap values is about 1. Although this example utilizes the normalization through the division, a non-division method may be used. One non-division method is to calculate the sum total of the tap values and then add the difference between 1 and the sum total to a specific tap (such as the tap having the maximum value and the center tap).

Figures 13A, 13B:
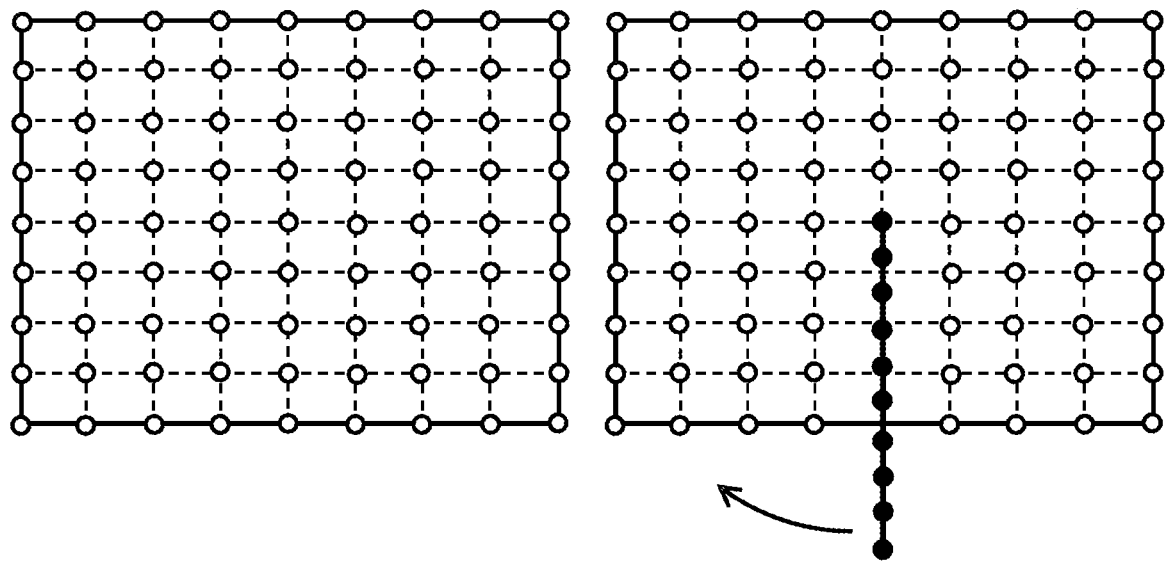
FIGS. 13A and 13B explain the rotation processing of a point spread function.

FIG. 13A illustrates a relationship between the position of the generated unsharp mask and the input image. A white dot illustrates a position of the generated unsharp mask. The input image is divided as illustrated in FIG. 13A, and an unsharp mask is generated at eighty-one points. Then, the interpolation processing is performed for the unsharp mask, and thereby the unsharp mask can be generated at an arbitrary position in the input image so as to handle with the image height change of the PSF. Herein, the number of divisions is 9×9 in FIG. 13A, but may be smaller for the lightweight purposes or larger for the accuracy purposes. Each point of the white dot in FIG. 13A may be generated through the interpolation rather than acquiring the direct PSF.

FIG. 13B illustrates one example, and the unsharp mask is generated by the interpolation at each point. A black dot in FIG. 13B illustrates the unsharp mask to be generated in the step S13. In general, the PSF of the imaging optical system can be rotationally symmetrical and thus the unsharp mask is also rotationally symmetrical. Based on this characteristic, the example in FIG. 13B generates unsharp masks at ten points from the image center in the down direction, and the unsharp mask through the interpolation at a position corresponding to each white dot by rotating them around the image center. Thereby, it is unnecessary to produce the unsharp mask one by one at each point in the input image, and thus the processing load can reduce. The image height is treated as described above.

Next, in the step S14 in FIG. 1, the image processor 105 (sharpening processor 1053) executes the sharpening processing for the captured image with the unsharp mask USM generated in the step S13. This embodiment uses the PSF of the imaging optical system for the unsharp mask USM, and thus can accurately correct and sharpen the input image even when the image is deteriorated by the asymmetrical PSF of the imaging optical system as seen in the periphery of the input image.

The image g(x, y) after the sharpening processing can be expressed as in the following Expressions (17), (18), and (19) based on Expression (1) and (3).

$$g(x,y)=f(x,y)+m\times\{f(x,y)-f(x,y)*USM(x,y)\} \quad (17)$$

$$g(x,y)=f(x,y)+m\times f(x,y)*\{\delta(x,y)-USM(x,y)\} \quad (18)$$

$$g(x,y)=f(x,y)*\{\delta(x,y)+m\times(\delta(x,y)-USM(x,y))\} \quad (19)$$

A brace in Expression (19) will be referred to as a sharpening filter for convenience. The sharpening filter can be generated with the unsharp mask USM and the adjustment coefficient m. The adjustment coefficient m is determined based on the overcorrection and the insufficient correction of the sharpening and the noises in the image. In the step S14, the sharpening processor 1053 executes the sharpening processing for the input image based on Expression (19) and the unsharp mask shaped in the step S13.

This embodiment discretely maintains the unsharp mask USM for the input image as illustrated in FIG. 13A. The corresponding unsharp mask USM or sharpening filter is necessary for sharpening processing at the position other than the white dot in FIG. 13A. This embodiment can perform the sharpening processing at an arbitrary position through a linear interpolation to the discretely generated unsharp mask USM. More specifically, the unsharp mask USM corresponding to a certain position is generated through a linear interpolation of the unsharp masks at four white dots near the certain point, and the sharpening processing is executed based on Expression (19). This configuration can provide the sharpening processing at an arbitrary position in the image, the continuously changing sharpening effect in the image, and a naturally sharpened image. The linear interpolation may be performed by the sharpening filter instead of the unsharp mask USM.

This embodiment explains the sharpening processing based on Expression (19), but may perform the sharpening processing using Expression (17) or Expression (18) for similar effects. Expression (17) or (18) adds a correction component to the input image but this expression is established where the adjustment coefficient m is positive. Where the adjustment coefficient m is negative, the correction component is subtracted from the input image. Thus, although the code of the adjustment coefficient m is different, this operation expresses the same meaning and thus any one of the operations may be used as long as the code of the adjustment coefficient is properly adjusted.

This embodiment uses Expression (8) corresponding to the PSF of the imaging optical system and the approximated PSF generated from the coefficient for the unsharp mask USM. Therefore, it is possible to accurately sharpen the deterioration caused by the asymmetric PSF of the imaging optical system as seen in the periphery of the input image. In addition, this embodiment uses the discretization adjustment coefficient in reconstructing the approximated PSF, and realizes the sharpening processing with a high correction accuracy by adjusting the discretization interval through the discretization adjustment coefficient and by controlling the gain of the filter through the adjustment coefficient m. This embodiment does not necessarily include the gain control of the filter through the adjustment coefficient m, and may perform adjust the discretization interval through the discretization adjustment coefficient.

As described above, the image processing method according to this embodiment can execute accurate sharpening processing while reducing the information amount required for sharpening processing.

Second Embodiment

Next follows a description of an imaging apparatus according to a second embodiment of the present invention. The imaging apparatus according to this embodiment has the same configuration as that of the first embodiment, and a detailed description thereof will be omitted.

Figure 21:
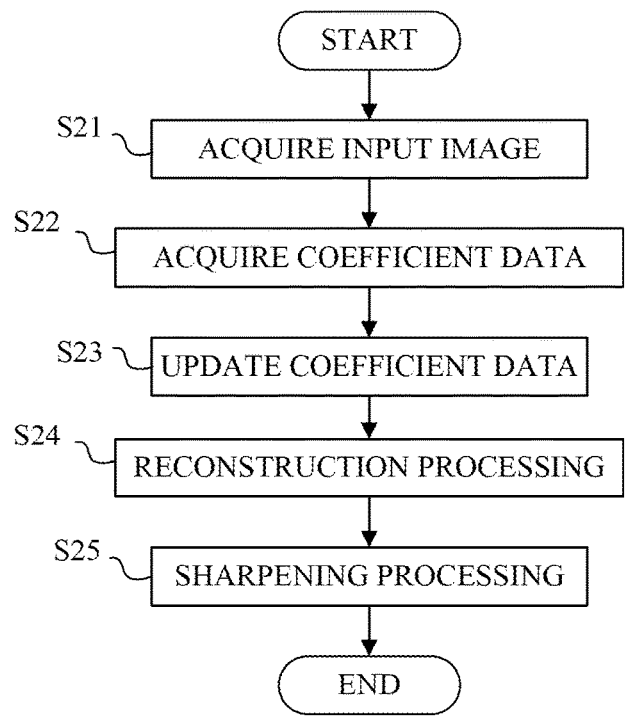
FIG. 21 is a flowchart illustrating an image processing method according to a second embodiment.

Referring now to FIG. 21, a description will be given of the image processing method according to this embodiment. FIG. 21 is a flowchart of an image processing method according to this embodiment. The image processing method according to this embodiment is different from that of the first embodiment only in the step S23. The steps S21, S22, S24, and S25 are the same as the steps S11 to S14 of FIG. 1, respectively, and a description thereof will be omitted.

In the step S13, the image processor 105 (reconstruction processor 1052) updates (converts) the coefficient data acquired in the step S22. Now assume that (i, j) is a discretized coordinate by the reconstruction processing in the following step S24. Then, a relationship between (x, y) in Expression (8) and the discretized coordinate (i, j) can be expressed by the following Expressions (20a) and (20b).

$$x = \frac{\Delta}{\Delta_f N_f} i \quad (20a)$$

$$y = \frac{\Delta}{\Delta_f N_f} j \quad (20b)$$

Assume in Expressions (20a) and (20b) that $\Delta$ is a discretization interval, $\Delta_f$ is an interval in fitting, ($2N_f+1$) is the tap number in fitting, and ($2n+1$) is the tap number of the discretized PSF where $N_f$ and n are integers. The discretized PSF can be expressed using Expressions (8), (20a), and (20b), and each tap value can be calculated by sequentially substituting integer values from $-n$ to n for i and j.

Based on Expressions (8), (20a), and (20b), the discretized PSF data can be converted as in the following Expressions (21) (Expressions (21a) to (21c)).

When i≥0 and j≥0, $$P(i,j)=(\sigma+a\gamma^2 i^2+2b\gamma^2 ij+c\gamma^2 j^2)^{-\beta}-e \quad (21a)$$

When i≥0 and j<0, $$P(i,j)=(\sigma+a\gamma^2 x^2+2bd\gamma^2 ij+cd^2\gamma^2 j^2)^{-\beta}-e \quad (21b)$$

When i<0, $$P(i,j)=P(-i,j) \quad (21c)$$

In Expressions (21), $\gamma=\Delta/\Delta_f N_f$ and the discretization interval $\Delta$ corresponds to f(p) in Expression (16). Since $\Delta_f$ and $N_f$ are coefficient data determined when the PSF is converted into a function, $\gamma$ is determined by the pixel pitch in the image sensor 104. The coefficients a, b, and c are multiplied by a square of $\gamma$ in Expressions (21), and it is considered that these coefficients change due to the change in the pixel pitch. The step S23 updates (converts) the coefficient data (generates updated coefficient data) by multiplying the coefficients a, b, and c among the coefficient data acquired in the step S22 by the square of $\gamma$ determined according to the pixel pitch and the discretization adjustment coefficient. For the coefficients other than the coefficients a, b, and c, there is no influence even when the pixel pitch changes. Hence, this embodiment uses the pre-update coefficient for the post-update coefficient data.

When the image sensor 104 generates the PSF data for each color in the Bayer array, it is necessary to double the discretization interval Δ since the same color is arranged every other pixel. In that case, doubling γ can handle this similarly. While the first embodiment performs the discretization processing at intervals corresponding to the pixel pitch in the reconstruction, this embodiment previously updates the coefficient data according to the pixel pitch and the reconstruction does not depend on the pixel pitch. The method according to the first embodiment and the method according to the second embodiment have the same reconstructed PSF data and sharpening result, but this embodiment includes the step of updating the coefficient data and further simplifies the subsequent reconstruction processing.

The processing following the step S24 performs the reconstruction processing in the step S13 according to the first embodiment and the sharpening processing in the step S14 using the updated coefficient data generated in the step S23, and thereby executes accurate sharpening processing.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

The above embodiments can provide an image processing apparatus, an imaging apparatus, an image processing method, a storage medium, and a lens apparatus which can perform accurate sharpening processing.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-000788, filed on Jan. 5, 2018 which is hereby incorporated by reference herein in its entirety.

What is claimed is:

1. An image processing apparatus comprising:
at least one memory storing instructions; and
at least one processor that implements the stored instructions to execute a plurality of tasks, including:
an acquiring task that acquires a captured image generated through imaging using an optical system;
a reconstruction task that reconstructs a discretized point spread function of the optical system using coefficient data used to approximate the point spread function; and
a sharpening task that performs an unsharp mask processing for the captured image based on information on the reconstructed point spread function,
wherein a discretization interval of the reconstructed point spread function is different according to an image height.

2. The image processing apparatus according to claim 1, wherein the sharpening task performs the unsharp mask processing for the captured image using a filter generated based on the information on the reconstructed point spread function.

3. The image processing apparatus according to claim 2, wherein the filter is a two-dimensional filter with filter coefficients that are rotationally asymmetrically distributed.

4. The image processing apparatus according to claim 2, wherein the coefficient data includes an adjustment coefficient for controlling a gain of the filter.

5. The image processing apparatus according to claim 4, wherein the adjustment coefficient is different according to the image height.

6. The image processing apparatus according to claim 1, wherein the reconstruction task reconstructs the point spread function using a discretization coefficient configured to adjust a discretization of the point spread function.

7. The image processing apparatus according to claim 6, wherein the discretization coefficient is a coefficient of a linear function for a pixel pitch in an image sensor used to capture the captured image.

8. The image processing apparatus according to claim 6, wherein the discretization coefficient is different according to the image height.

9. The image processing apparatus according to claim 7, wherein the reconstruction task:
updates the coefficient data using the discretization coefficient and the pixel pitch; and
reconstructs the point spread function using the updated coefficient data.

10. The image processing apparatus according to claim 1, wherein:
the point spread function includes a point spread function corresponding to an imaging condition of the captured image, and
the imaging condition includes at least one of the image height, a focal length, an F-number, or an imaging distance.

11. An imaging apparatus comprising:
an image sensor configured to photoelectrically convert an optical image formed via an optical system; and
an image processing apparatus according to claim 1.

12. The imaging apparatus according to claim 11, wherein:
a lens apparatus is attachable to and configured to communicate with the imaging apparatus, and includes the optical system, the reconstruction task reconstructs the point spread function based on a discretization coefficient configured to adjust the discretization of the point spread function, the lens apparatus further includes a memory storing the coefficient data and the discretization coefficient relating to the optical system, and the imaging apparatus communicates with the lens apparatus and acquires the coefficient data and the discretization coefficient stored in the memory.

13. An image processing method comprising the steps of:

acquiring a captured image generated through imaging by an optical system;

reconstructing a discretized point spread function of the optical system using coefficient data used to approximate the point spread function; and performing unsharp mask processing for the captured image based on information on the reconstructed point spread function, wherein a discretization interval of the reconstructed point spread function is different according to an image height.

14. A non-transitory computer readable storage medium storing a computer program executable by a computer to execute an image processing method comprising the steps of:

acquiring a captured image generated through imaging using an optical system;

reconstructing a discretized point spread function of the optical system using coefficient data used to approximate the point spread function; and performing unsharp mask processing for the captured image based on information on the reconstructed point spread function, wherein a discretization interval of the reconstructed point spread function is different according to an image height.

15. A lens apparatus attachable to an imaging apparatus having including an image sensor and configured to communicate with the imaging apparatus, the lens apparatus comprising:

an optical system; and a memory storing coefficient data used to approximate a point spread function of the optical system and a discretization coefficient used to adjust a discretization interval in reconstructing the point spread function so that the discretization interval is different according to an image height, wherein the imaging apparatus:

reconstructs the discretized point spread function using the coefficient data and the discretization coefficient transmitted from the lens apparatus; and performs unsharp mask processing for a captured image generated through imaging by the optical system based on information on the reconstructed point spread function.

* * * * *